(12) United States Patent
Tanaka et al.

(10) Patent No.: US 9,728,294 B2
(45) Date of Patent: Aug. 8, 2017

(54) RESIN COMPOSITE MATERIAL

(75) Inventors: Hiromitsu Tanaka, Aichi-gun (JP); Makoto Kato, Chita (JP); Osamu Watanabe, Nagoya (JP); Kenichi Hayashida, Aichi-gun (JP); Hirotaka Okamoto, Kariya (JP); Toshio Watanabe, Toyota (JP); Takayuki Nagai, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 139 days.

(21) Appl. No.: 13/701,768

(22) PCT Filed: Jun. 7, 2011

(86) PCT No.: PCT/JP2011/063038
§ 371 (c)(1),
(2), (4) Date: Apr. 11, 2013

(87) PCT Pub. No.: WO2011/155487
PCT Pub. Date: Dec. 15, 2011

(65) Prior Publication Data
US 2013/0200311 A1 Aug. 8, 2013

(30) Foreign Application Priority Data

Jun. 7, 2010 (JP) ................................. 2010-129652
Feb. 3, 2011 (JP) ................................. 2011-021562
(Continued)

(51) Int. Cl.
*H01B 1/04* (2006.01)
*B82Y 30/00* (2011.01)
(Continued)

(52) U.S. Cl.
CPC ................ *H01B 1/04* (2013.01); *B82Y 30/00* (2013.01); *B82Y 40/00* (2013.01); *C01B 31/04* (2013.01);
(Continued)

(58) Field of Classification Search
CPC ....... C01B 31/04; C01B 31/0438; H01B 1/04; C08K 3/04; C08K 9/08; C08K 9/12;
(Continued)

(56) References Cited

U.S. PATENT DOCUMENTS 4,557,974 A 12/1985 Tsukuda et al.
6,110,994 A 8/2000 Cooke et al.
(Continued)

FOREIGN PATENT DOCUMENTS

JP A-59-96142 6/1984
JP B2-62-15119 4/1987
(Continued)

OTHER PUBLICATIONS

Bao-Qing Zhang, Guang-De Chen, Cai-Yuan Pan, Bin Luan, and Chun-Yan Hong. Preparation, Characterization, and Thermal Properties of Polystyrene-block-Quaternized Poly (4-vinylpyridine)/Montmorillonite Nanocomposites. J. of Appl. Polym. Sci. 2006; 1950-1958.*
(Continued)

*Primary Examiner* — Peter F Godenschwager
*Assistant Examiner* — Andrew J Oyer
(74) *Attorney, Agent, or Firm* — Oliff PLC

(57) ABSTRACT

A resin composite material includes: fine graphite particles including plate-like graphite particles, an aromatic vinyl copolymer which is adsorbed on the plate-like graphite particles, and which contains a vinyl aromatic monomer unit represented by the following formula (1):

$$-(CH_2-CHX)-  \qquad (1)$$

(Continued)

100 μm (in the formula (1), X represents a phenyl group, a naphthyl group, an anthracenyl group, or a pyrenyl group, provided that these groups may have each a substituent), and at least one hydrocarbon chain which is bonded to the aromatic vinyl copolymer, and which is selected from the group consisting of alkyl chains, oligoolefin chains, and polyolefin chains.

19 Claims, 13 Drawing Sheets

(30) Foreign Application Priority Data

Apr. 28, 2011 (JP) .................................. 2011-101954
Apr. 28, 2011 (JP) .................................. 2011-101958

(51) Int. Cl.
| | |
|---|---|
| B82Y 40/00 | (2011.01) |
| C01B 31/04 | (2006.01) |
| C08K 9/08 | (2006.01) |
| C08K 9/12 | (2006.01) |
| C08L 25/06 | (2006.01) |

(52) U.S. Cl.
CPC ............ *C01B 31/0438* (2013.01); *C08K 9/08* (2013.01); *C08K 9/12* (2013.01); *C08L 25/06* (2013.01)

(58) Field of Classification Search
CPC ......... H01L 31/04; B82Y 30/00; B82Y 40/00; C08L 25/06
USPC .......................................... 252/511; 428/407
See application file for complete search history.

(56) References Cited

U.S. PATENT DOCUMENTS

| | | | |
|---|---|---|---|
| 6,927,250 | B2 | 8/2005 | Kaschak et al. |
| 7,914,844 | B2 | 3/2011 | Stankovich et al. |
| 2002/0022122 | A1 | 2/2002 | Hirata et al. |
| 2003/0180597 | A1 | 9/2003 | Sakamoto et al. |
| 2006/0035081 | A1 | 2/2006 | Morita et al. |
| 2007/0228339 | A1 | 10/2007 | Fujiwara et al. |
| 2009/0146112 | A1 | 6/2009 | Yokouchi |
| 2010/0147188 | A1 | 6/2010 | Mamak et al. |
| 2010/0163795 | A1 | 7/2010 | Kim et al. |
| 2011/0152435 | A1 | 6/2011 | Morishita et al. |
| 2013/0096247 | A1 | 4/2013 | Takahashi et al. |
| 2013/0143998 | A1 | 6/2013 | Tanaka |

FOREIGN PATENT DOCUMENTS

| | | | | |
|---|---|---|---|---|
| JP | A-02-204317 | 8/1990 | | |
| JP | A-10-330108 | 12/1998 | | |
| JP | A-2002-053313 | 2/2002 | | |
| JP | A-2002-508422 | 3/2002 | | |
| JP | A-2003-012311 | 1/2003 | | |
| JP | A-2003-176116 | 6/2003 | | |
| JP | A-2003-253127 | 9/2003 | | |
| JP | A-2003-268245 | 9/2003 | | |
| JP | A-2004-134515 | 4/2004 | | |
| JP | A-2005-053773 | 3/2005 | | |
| JP | A-2005-281448 | 10/2005 | | |
| JP | A-2005-320220 | 11/2005 | | |
| JP | A-2006-33024 | 2/2006 | | |
| JP | A-2006-111731 | 4/2006 | | |
| JP | A-2006-144201 | 6/2006 | | |
| JP | A-2006-233017 | 9/2006 | | |
| JP | 2007-002231 | * | 1/2007 | ............ C08L 101/00 |
| JP | A-2007-2231 | 1/2007 | | |
| JP | A-2007-5547 | 1/2007 | | |
| JP | A-2007-291346 | 11/2007 | | |
| JP | A-2008-179741 | 8/2008 | | |
| JP | A-2009-029677 | 2/2009 | | |
| JP | A-2009-144000 | 7/2009 | | |
| JP | A-2009-155628 | 7/2009 | | |
| JP | A-2009-242209 | 10/2009 | | |
| JP | A-2010-037537 | 2/2010 | | |
| JP | A-2010-100837 | 5/2010 | | |
| JP | A-2010-155993 | 7/2010 | | |
| JP | B2-4945419 | 6/2012 | | |
| JP | A-2013-119576 | 6/2013 | | |
| WO | WO 02/01660 A1 | 1/2002 | | |
| WO | WO 2007/039435 A1 | * | 4/2007 | ............... C08K 3/34 |
| WO | WO 2009/075322 A1 | 6/2009 | | |
| WO | WO 2009/106507 A2 | 9/2009 | | |
| WO | 2011/158906 A1 | 12/2011 | | |
| WO | WO 2011/155486 A1 | 12/2011 | | |
| WO | WO 2011/155487 A1 | 12/2011 | | |

OTHER PUBLICATIONS

Fawn M. Uhl, Qiang Yao, and Charles Wilkie. Formation of nanocomposites of styrene and its copolymers using graphite as the nanomaterial. Polym. Adv. Technol. 2005; 16:533-540.*
Fawn Uhl and Charles Wilkie "Preparation of nanocomposites from styrene and modified graphite oxide" Polymer degradation and Stability 84 (2004) 215-226.*
Stankovich et al. "Synthesis of graphene-based nanosheets via chemical reduction of exfoliated graphite oxide" Carbon 45 (2007) 1558-1565.*
Stankovich et al., "Stable aqueous dispersions of graphitic nanoplatelets via the reduction of exfoliated graphite oxide in the presence of poly(sodium 4-styrenesulfonate)," *Journal of Materials Chemistry*, 2006, vol. 16, No. 2, pp. 155-158.
Kurokawa et al., "Dispersion and Coating Film Characteristics of Graphite Particles Adsorbed with Polymers," *Material Technology*, 2002, vol. 20, No. 4, pp. 165-172 (with abstract).
Wissert et al., "Graphene Nanocomposites Prepared From Blends of Polymer Latex with Chemically Reduced Graphite Oxide Dispersions," *Macromolecular Materials and Engineering*, 2010, vol. 295, No. 12, pp. 1107-1115.
Sep. 13, 2011 International Search Report issued in International Patent Application No. PCT/JP2011/063038.
Jan. 17, 2013 translation of International Preliminary Report on Patentability issued in International Patent Application No. PCT/JP2011/063038.
Japanese Office Action dated Jul. 14, 2014 issued in Japanese Patent Application No. 2011-021562 (with translation).
Office Action dated Sep. 25, 2014 issued in U.S. Appl. No. 13/702,548.
Japanese Office Action dated Sep. 11, 2014 issued in Japanese Patent Application No. 2011-127081 (with translation).
Chinese Office Action dated Sep. 22, 2014 issued in Chinese Patent Application No. 201180028215.9 (with translation).
Oct. 23, 2013 Japanese Office Action issued in Japanese Patent Application No. JP 2011-021562 (with partial translation).
U.S. Appl. No. 13/702,548, filed Jan. 23, 2013 in the name of Tanaka et al.
U.S. Appl. No. 13/705,765, filed Dec. 5, 2012 in the name of Tanaka.
Apr. 5, 2013 Supplemental Office Action issued in U.S. Appl. No. 13/705,765.
Nov. 8, 2013 Office Action issued in U.S. Appl. No. 13/705,765.
Mar. 28, 2013 Office Action issued in U.S. Appl. No. 13/705,765.
Sato et al., "Polymer Encapsulation of Exfoliated Graphite by Polymerization of Styrene in Water," *Polymer Preprints*, 1999, vol. 48, No. 2, p. 145.
Sep. 13, 2011 International Search Report issued in International Patent Application No. PCT/JP2011/063037 (with translation).
Jan. 17, 2013 International Preliminary Report on Patentability issued in International Patent Application No. PCT/JP2011/063037 (with translation).
Japanese Office Action dated Dec. 27, 2013 issued in Japanese Patent Application No. 2011-267228 (with translation).

(56) References Cited

OTHER PUBLICATIONS

Japanese Office Action dated Dec. 25, 2013 issued in Japanese Patent Application No. 2011-127081 (with translation).
Zhang et al., "Flammability and thermal stability studies of styrene-butyl acrylate copolymer/graphite oxide nanocomposite," Polymer Degradation and Stability, vol. 85 (2004), pp. 583-588.
Nov. 2, 2014 Office Action issued in Chinese Application No. 201180038223.1.
Mar. 26, 2015 Office Action issued in Japanese Patent Application No. 2011-127083.
Sep. 15, 2015 Office Action issued in Japanese Patent Application No. 2011-127083.

* cited by examiner

100 μm

100 μm

100 μm

100 μm

100 μm

100 μm

20 μm

50 μm

RESIN COMPOSITE MATERIAL

TECHNICAL FIELD

The present invention relates to a resin composite material comprising graphite particles.

BACKGROUND ART

Conventionally, addition of various fillers to resins has been studied for imparting characteristics of the fillers to the resins. For example, addition of a glass fiber, a carbon fiber, or the like has been studied for imparting rigidity, and addition of a filler of metal such as copper or aluminum, or a carbon filler such as graphite, carbon black, or carbon nanotube has been studied for imparting electrical conductivity (for example, Japanese Unexamined Patent Application Publication No. 2007-5547 (PTL 1), Japanese Unexamined Patent Application Publication No. 2010-155993 (PTL 2)).

In particular, olefin-based resins are excellent in terms of the balance between the price and the mechanical properties, and are one of the most widely used types of resin. Various fillers such as graphite particles have been conventionally added to such olefin-based resins for imparting various characteristics. For example, Japanese Unexamined Patent Application Publication No. Sho 59-96142 (PTL 3) discloses that an electrically conductive filler such as carbon black or graphite is incorporated into a thermoplastic resin such as polypropylene, so that electrical conductivity is imparted to the thermoplastic resin, and the electromagnetic wave shielding property of the thermoplastic resin is improved.

However, when a glass fiber, a carbon fiber, a metal filler, or a carbon filler is simply mixed, as it is, with a resin as described in the PTLs 1 to 3, it cannot be said that the characteristics of the filler are sufficiently imparted to the resin. For example, graphite particles are easily aggregated, have a low affinity for resins, and hence are dispersed in a resin in an aggregated state. The aggregated graphite particles make it difficult to sufficiently exhibit their characteristics such as heat resistance, chemical resistance, mechanical strength, thermal conductivity, and electrical conductivity. In particular, graphite particles have a remarkably low affinity for olefin-based resins such as polypropylene, and are easily aggregated and difficult to uniformly disperse in an olefin-based resin. Hence, it cannot be said that electrical conductivity and mechanical properties of the graphite particles are sufficiently imparted to the olefin-based resin.

In this respect, various methods have been proposed for highly dispersing graphite particles in a resin. For example, disclosed are a method in which a surface of a carbon filler such as graphite is modified with a carboxylic acid ester to change the properties of the surface, and then the modified carbon filler is added to a polymer (for example, International Application Japanese-Phase Publication No. 2002-508422 (PTL 4)), a method in which graphite oxide having an organic onium ion intercalated therein is melt kneaded with a thermoplastic resin (Japanese Unexamined Patent Application Publication No. 2006-233017 (PTL 5)), and the like. Moreover, although not directed to graphite particles, a method in which a nano carbon composite material whose surface is coated with a polyimide-based resin or the like is added (Japanese Unexamined Patent Application Publication No. 2006-144201 (PTL 6)), a method in which a lamellar carbon subjected to a hydrogenation or alkylation treatment is uniformly and finely dispersed in a resin (Japanese Unexamined Patent Application Publication No. 2003-268245 (PTL 7)), and the like are disclosed as methods for highly dispersing a nano carbon.

However, when a carbon material is subjected to a surface modification treatment as described above, the characteristics (in particular, electrical conductivity) of the carbon material tend to be impaired. For this reason, although the carbon material is highly dispersed in the resin, the characteristics are not imparted sufficiently. Hence, the methods described in PTL 4 to 7 still have room for improvement. In particular, there is a problem that even when an alkylation treatment is conducted on graphite particles by using an alkylzinc compound according to the method described in PTL 7, surfaces of the graphite particles are not alkylated, and further the conjugated structure on the surfaces of the graphite particles is destructed, and the electrical conductivity is lowered. Moreover, since organometallic compounds such as alkylzinc compounds are unstable, and difficult to handle, this method is unsuitable for industrial production.

CITATION LIST

Patent Literature

[PTL 1] Japanese Unexamined Patent Application Publication No. 2007-5547
[PTL 2] Japanese Unexamined Patent Application Publication No. 2010-155993
[PTL 3] Japanese Unexamined Patent Application Publication No. Sho 59-96142
[PTL 4] International Application Japanese-Phase Publication No. 2002-508422
[PTL 5] Japanese Unexamined Patent Application Publication No. 2006-233017
[PTL 6] Japanese Unexamined Patent Application Publication No. 2006-144201
[PTL 7] Japanese Unexamined Patent Application Publication No. 2003-268245

SUMMARY OF INVENTION

Technical Problem

The present invention has been made in view of the above-described problems of the conventional technologies, and an object of the present invention is to provide a novel resin composite material in which graphite particles are dispersed in a resin without impairment of the characteristics thereof.

Solution to Problem

The present inventors have conducted earnest studies in order to achieve the above object. As a result, the present inventors have found that when fine graphite particles obtained by mixing graphite particles, a specific aromatic vinyl copolymer, and a peroxyhydrate, and subjecting this mixture to a grinding treatment are added to a polystyrene, a polyphenylene ether, or a mixture thereof, plate-like graphite particles constituting the fine graphite particles are dispersed in the polystyrene, the polyphenylene ether, or the mixture thereof, so that a high rigidity and a high electrical conductivity are imparted thereto. This finding has led to the completion of the present invention.

Moreover, the present inventors also have found that, in particular, when at least one hydrocarbon chain of alkyl chains, oligoolefin chains, and polyolefin chains is introduced into the aromatic vinyl copolymer constituting the fine graphite particles, the plate-like graphite particles can be easily dispersed in an olefin-based resin, so that a high rigidity is imparted to the olefin-based resin. This finding has led to the completion of the present invention.

Specifically, a first resin composite material of the present invention comprises:
fine graphite particles comprising
plate-like graphite particles, and
an aromatic vinyl copolymer which is adsorbed on the plate-like graphite particles, and which contains a vinyl aromatic monomer unit represented by the following formula (1):

—(CH$_2$—CHX)—　　(1)

(in the formula (1), X represents a phenyl group, a naphthyl group, an anthracenyl group, or a pyrenyl group, provided that these groups may have each a substituent); and
at least one aromatic polymer selected from the group consisting of polystyrenes and polyphenylene ethers.

In the first resin composite material, an amount of the fine graphite particles is preferably 0.1 to 80% by mass. Moreover, the aromatic polymer is preferably a mixture of a polystyrene and a polyphenylene ether. In this case, an amount of the polystyrene in the mixture is preferably 20 to 80% by mass.

In addition, in the first resin composite material of the present invention, the aromatic vinyl copolymer preferably comprises the vinyl aromatic monomer unit and a polar monomer unit, and the polar monomer unit is preferably a monomer unit derived from at least one monomer selected from the group consisting of (meth)acrylic acid, (meth) acrylates, (meth)acrylamides, vinylpyridines, maleic anhydride, maleimides, and vinylimidazoles.

The first resin composite material of the present invention has a storage elastic modulus at 40° C. of preferably 2 GPa or higher, and a surface electrical resistance per unit length of preferably 10$^4$ Ω/cm or lower.

Meanwhile, a second resin composite material of the present invention comprises:
fine graphite particles comprising
plate-like graphite particles,
an aromatic vinyl copolymer which is adsorbed on the plate-like graphite particles, and which contains a vinyl aromatic monomer unit represented by the following formula (1):

—(CH$_2$—CHX)—　　(1)

(in the formula (1), X represents a phenyl group, a naphthyl group, an anthracenyl group, or a pyrenyl group, provided that these groups may have each a substituent), and
at least one hydrocarbon chain which is bonded to the aromatic vinyl copolymer, and which is selected from the group consisting of alkyl chains, oligoolefin chains, and polyolefin chains; and
an olefin-based resin.

In the second resin composite material, an amount of the fine graphite particles is preferably 0.1 to 80% by mass. Moreover, the fine graphite particles are preferably present in the olefin-based resin in a dispersed state. Further, the aromatic vinyl copolymer preferably has a functional group, and the hydrocarbon chain is preferably formed by bonding between the functional group and at least one selected from alkyl compounds, oligoolefins, and polyolefins which each have a moiety reactive with the functional group.

The aromatic vinyl copolymer having the functional group preferably comprises the vinyl aromatic monomer unit and another monomer unit derived from at least one monomer selected from the group consisting of (meth) acrylic acid, (meth)acrylates, (meth)acrylamides, vinylimidazoles, and vinylpyridines. Further, the functional group is preferably an amino group, and the moiety reactive with the functional group is preferably at least one selected from the group consisting of a chlorine atom, a carboxyl group, and a carboxylic anhydride group.

In the first and second resin composite materials of the present invention, an amount of the fine graphite particles is preferably 0.1 to 80% by mass.

Note that although it is not exactly clear why the fine graphite particles according to the present invention impart a high rigidity and a high electrical conductivity to at least one aromatic polymer selected from the group consisting of polystyrenes and polyphenylene ethers by the dispersing of the plate-like graphite particles therein, the present inventors presume as follows. Specifically, since the aromatic vinyl copolymer is adsorbed on surfaces of plate-like fine graphite particles in the fine graphite particles according to the present invention, the cohesive force between the plate-like graphite particles decreases. In addition, the vinyl aromatic monomer unit constituting the aromatic vinyl copolymer is excellent in the affinity for the aromatic polymer (especially polystyrene). Presumably because of these reasons, the fine graphite particles are successfully dispersed in the aromatic polymer (especially polystyrene). Moreover, it is presumed that since the vinyl aromatic monomer unit has a stable ability to adsorb on the plate-like graphite particles, the dispersion stability of the fine graphite particles is also improved. It is presumed that the first resin composite material of the present invention exhibits a high rigidity and a high electrical conductivity, because the fine graphite particles are highly dispersed in the aromatic polymer as described above.

Moreover, although it is not exactly clear why the introduction of the hydrocarbon chain into the aromatic vinyl copolymer constituting the fine graphite particles according to the present invention makes it possible to easily disperse the plate-like graphite particles in the olefin-based resin, and results in the impartment of a high rigidity to the olefin-based resin, the present inventors presume as follows. Specifically, ordinary graphite particles are easily aggregated, and have chemically inactive surfaces. Hence, ordinary graphite particles are difficult to disperse in an olefin-based resin, which has a low polarity. On the other hand, in the fine graphite particles according to the present invention, the aromatic vinyl copolymer is adsorbed on the surfaces of the plate-like fine graphite particles. Hence, the cohesive force between the plate-like graphite particles decreases. Moreover, at least one hydrocarbon chain of alkyl chains, oligoolefin chains, and polyolefin chains is introduced into the aromatic vinyl copolymer. Hence, the surfaces of the fine graphite particles are alkylated. The fine graphite particles whose surfaces are thus alkylated have an improved affinity for the olefin-based resin, and can be easily dispersed in the olefin resin, without aggregation. Presumably as a result of this, a high rigidity is imparted to the olefin-based resin.

Further, although it is not exactly clear why the use of a mixture of a polystyrene and a polyphenylene ether as the aromatic polymer according to the present invention in the first resin composite material of the present invention further improves the rigidity and electrical conductivity, the present inventors presumes as follows. Specifically, the fine graphite particles according to the present invention exhibit a high dispersibility in the polystyrene, but tend to have a lower dispersibility in the polyphenylene ether than that in the polystyrene. For this reason, it is presumed that when the ratio of the polyphenylene ether is increased by mixing the polyphenylene ether with the polystyrene, the dispersibility of the fine graphite particles in the mixture is lowered, so that part of the fine graphite particles are present in contact with each other. When a state where part of the fine graphite particles in the first resin composite material are in contact with each other is achieved as described above, a state is achieved where the particles are connected to each other to form a network structure, and electrical conduction paths are consequently formed in the first resin composite material. Presumably because of this, a higher electrical conductivity is exhibited in this state than in a state where the fine graphite particles are completely dispersed or in a state where the fine graphite particles are aggregated. Moreover, even when the first resin composite material is mechanically deformed, the network structure effectively reinforces the first resin composite material. Presumably because of this, a higher rigidity is exhibited in this state than in a state where the fine graphite particles are completely dispersed or in a state where the fine graphite particles are aggregated.

Advantageous Effects of Invention

According to the present invention, it is possible to obtain a resin composite material which has a high rigidity, and in which fine graphite particles are dispersed in a polystyrene, a polyphenylene ether, a mixture thereof, or an olefin-based resin.

Figure 10:
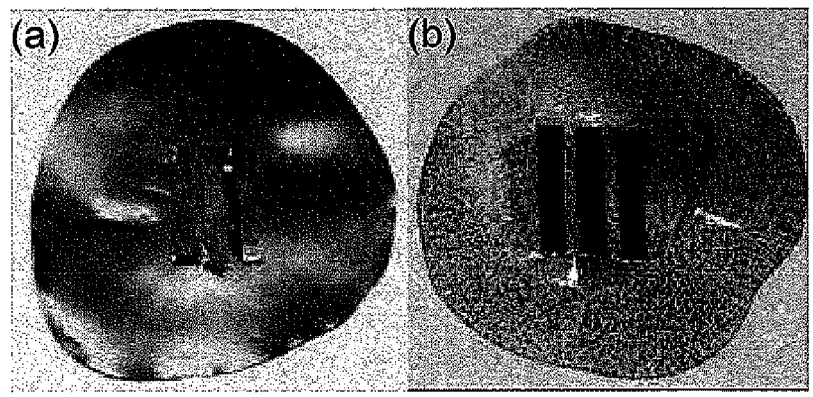

Part (a) of FIG. 10 shows a photograph of a PP resin composite material prepared in Example 7, and Part (b) of FIG. 10 shows a photograph of a PP resin composite material prepared in Comparative Example 3.

Figure 11:
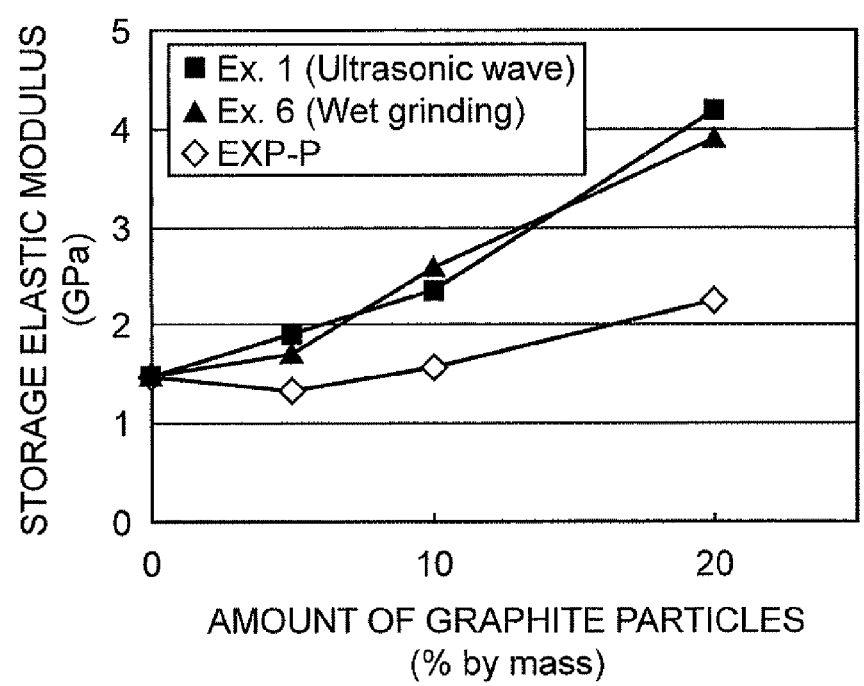

FIG. 11 is a graph showing the relationship between the amount of fine graphite particles or graphite particles in the PP resin composite material and the storage elastic modulus of the PP resin composite material.

Figure 12:
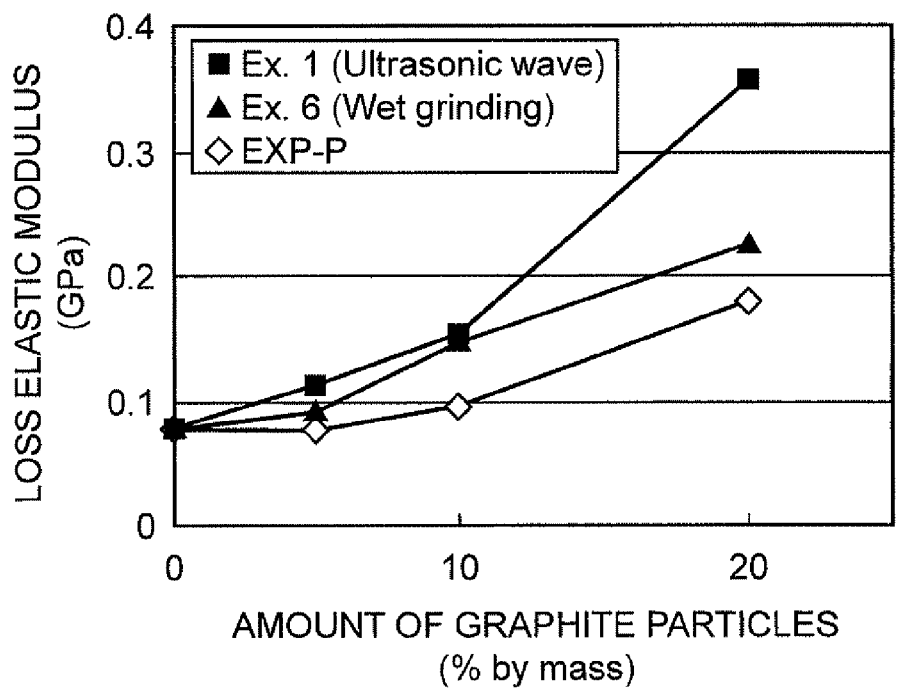

FIG. 12 is graph showing the relationship between the amount of fine graphite particles or graphite particles in the PP resin composite material and the loss elastic modulus of the PP resin composite material.

Figure 13:
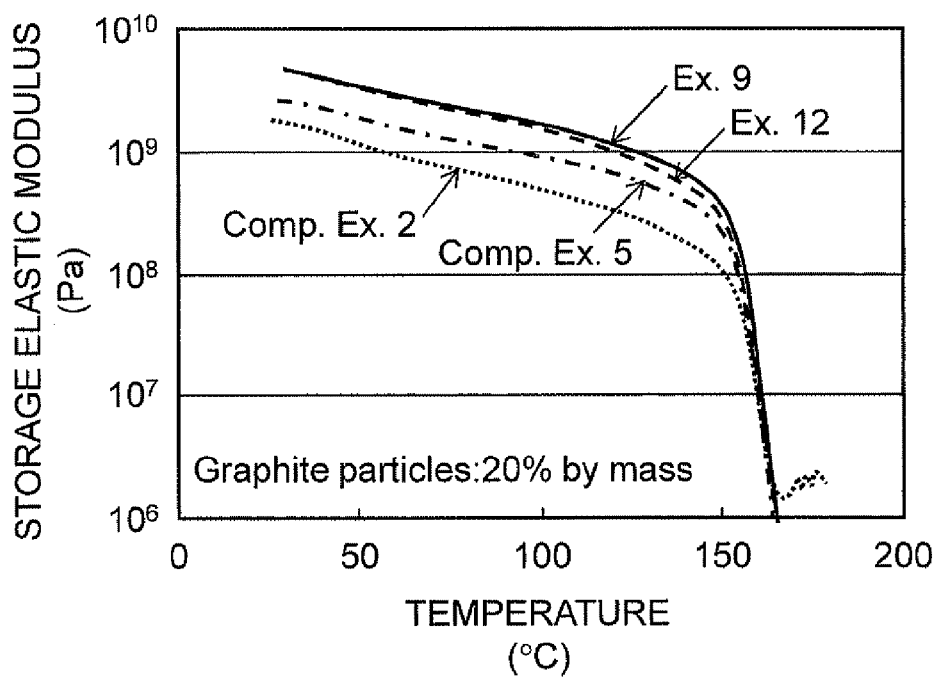

FIG. 13 is a graph showing the temperature dependence of the storage elastic modulus of each of PP resin composite materials prepared in Examples 9 and 12, and Comparative Example 5 and a PP resin material prepared in Comparative Example 2.

Figure 14:
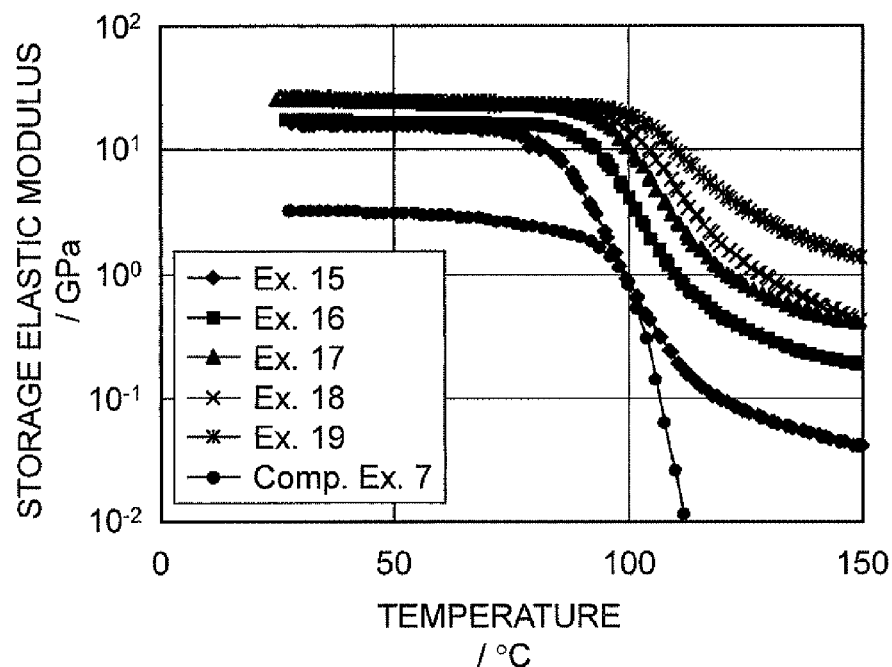

FIG. 14 is a graph showing the relationship between the temperature and the storage elastic modulus of each of polystyrene resin composite materials obtained in Examples 15 to 19 and a polystyrene resin material obtained in Comparative Example 7.

Figure 15:
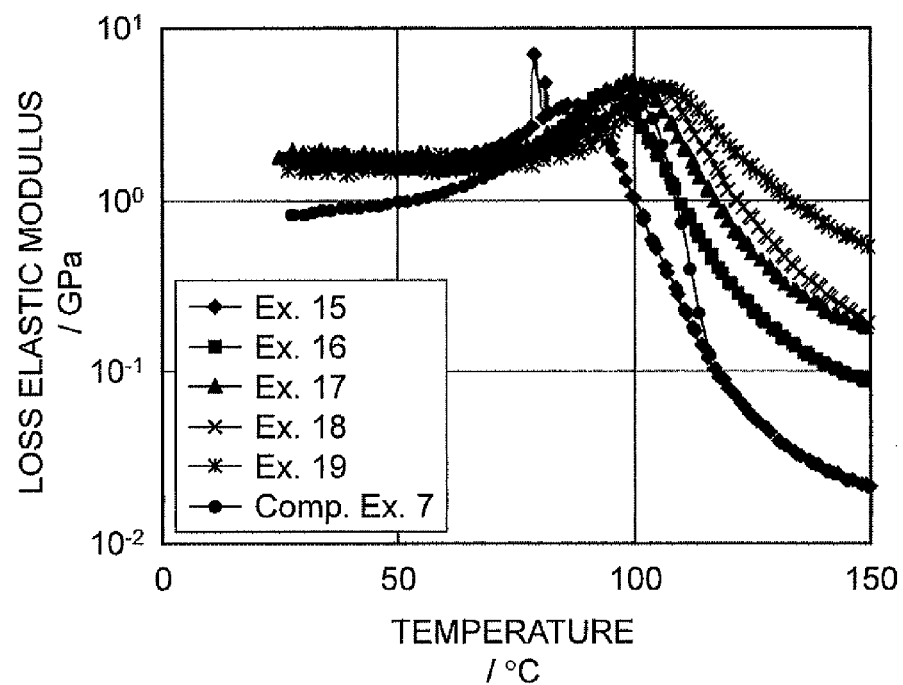

FIG. 15 is a graph showing the relationship between the temperature and the loss elastic modulus of each of the polystyrene resin composite materials obtained in Examples 15 to 19 and the polystyrene resin material obtained in Comparative Example 7.

Figure 16:
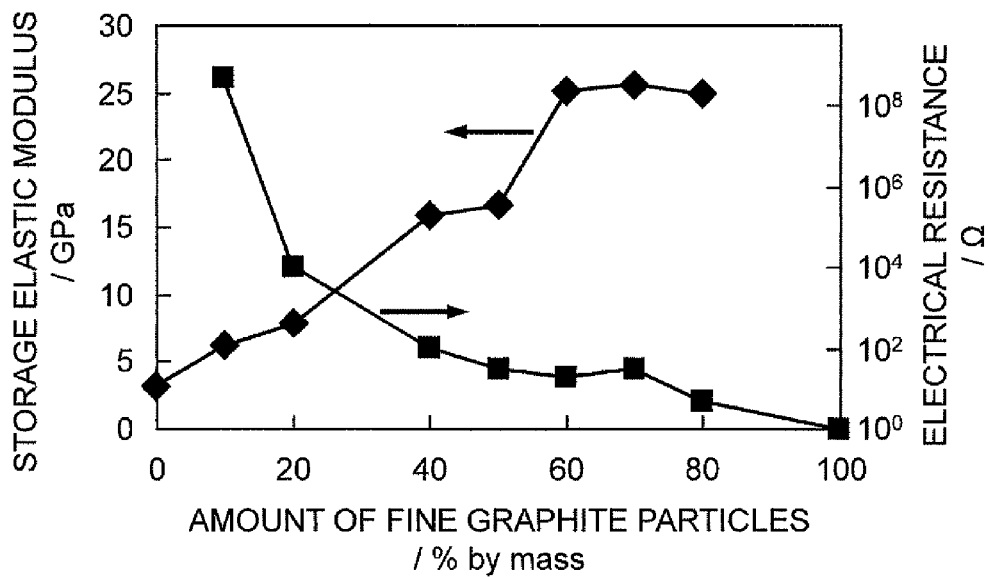

FIG. 16 is a graph showing the relationships between the amount of the fine graphite particles and the storage elastic modulus and between the amount of the fine graphite particles and the electrical resistance, in the polystyrene resin composite material.

Figure 17:
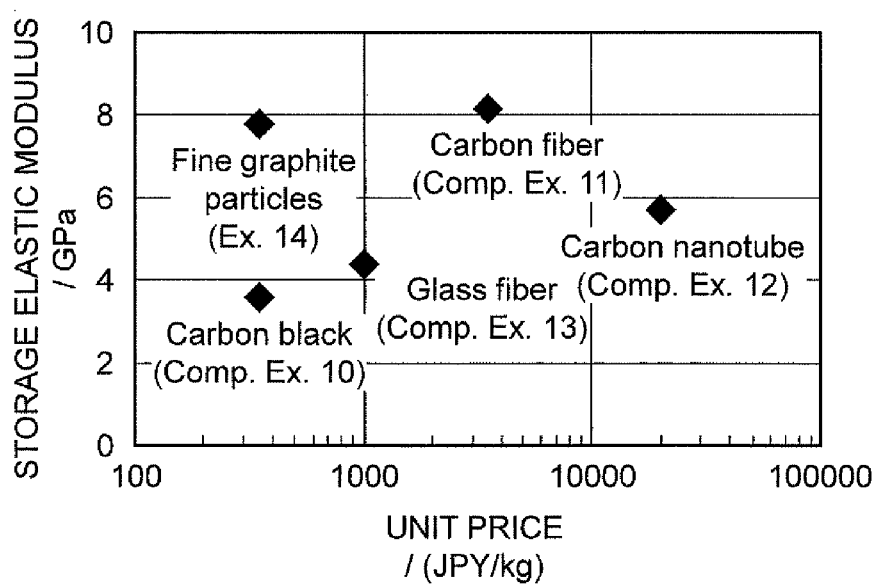

FIG. 17 is a graph showing the storage elastic moduli of a polystyrene resin composite material obtained in Examples 14 and polystyrene resin composite materials obtained in Comparative Examples 10 to 13.

Figure 18:
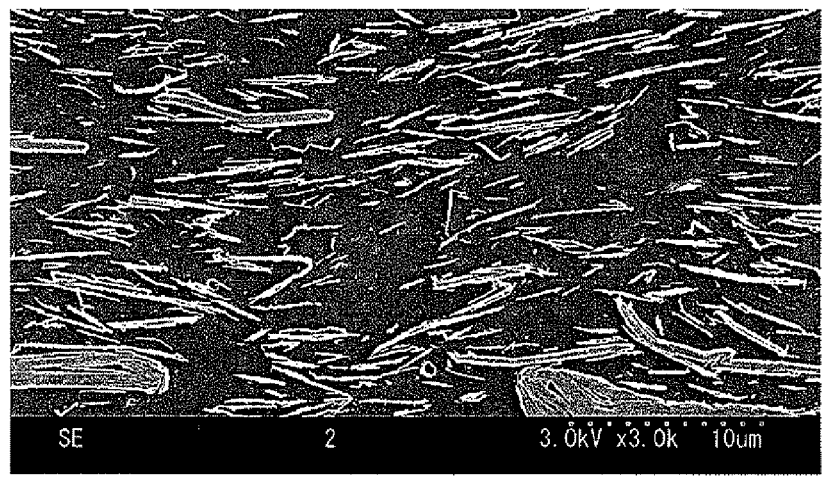

FIG. 18 is a scanning electron micrograph showing a cross-section of the polystyrene resin composite material obtained in Examples 14.

Figure 19:
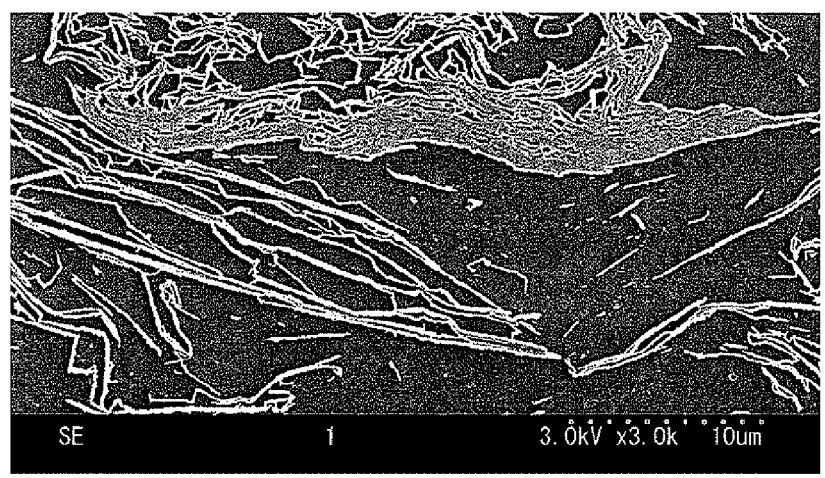

FIG. 19 is a scanning electron micrograph showing a cross-section of a polystyrene resin composite material obtained in Comparative Example 8.

Figure 20:
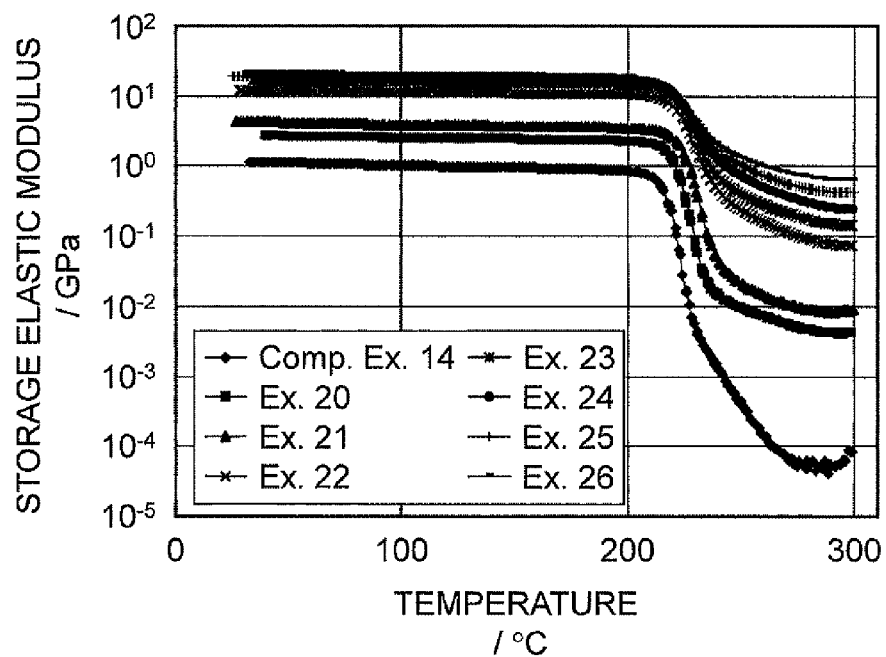

FIG. 20 is a graph showing the relationship between the temperature and the storage elastic modulus of each of polyphenylene ether resin composite materials obtained in Examples 20 to 26 and a polyphenylene ether resin material obtained in Comparative Example 14.

Figure 21:
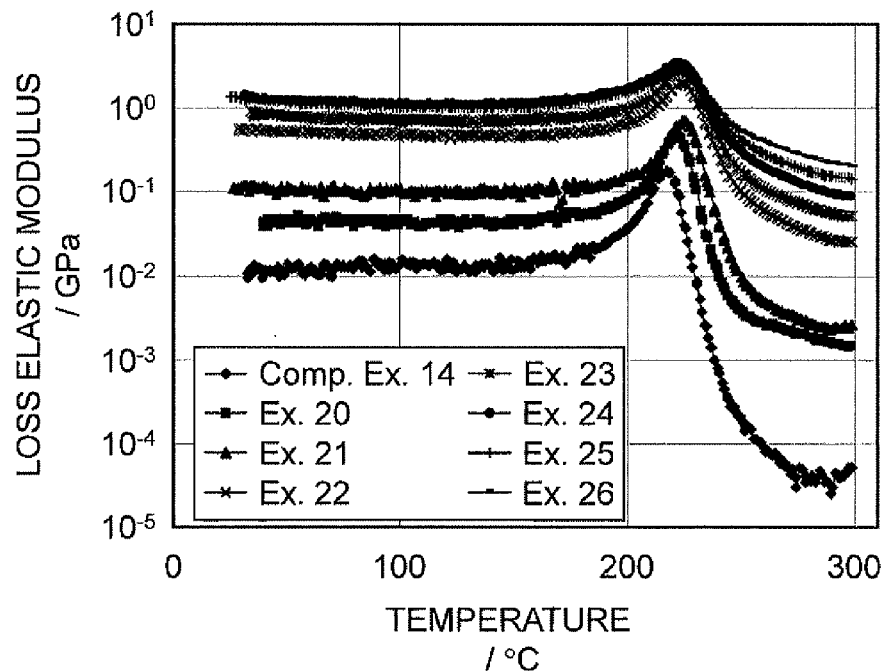

FIG. 21 is a graph showing the relationship between the temperature and the loss elastic modulus of each of the polyphenylene ether resin composite materials obtained in Examples 20 to 26 and the polyphenylene ether resin material obtained in Comparative Example 14.

Figure 22:
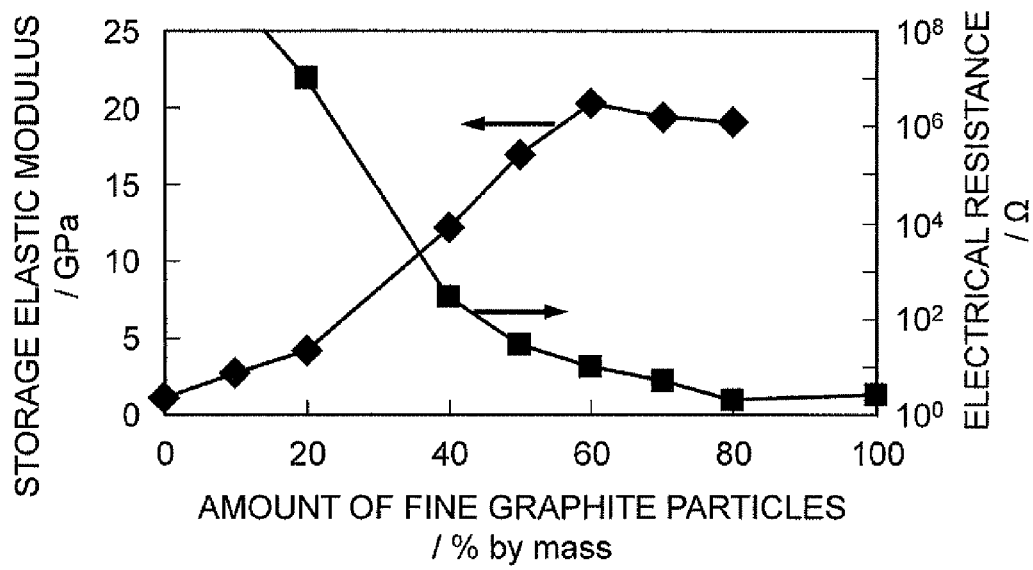

FIG. 22 is a graph showing the relationships between the amount of the fine graphite particles and the storage elastic modulus and between the amount of the fine graphite particles and the electrical resistance, in the polyphenylene ether resin composite material.

Figure 23:
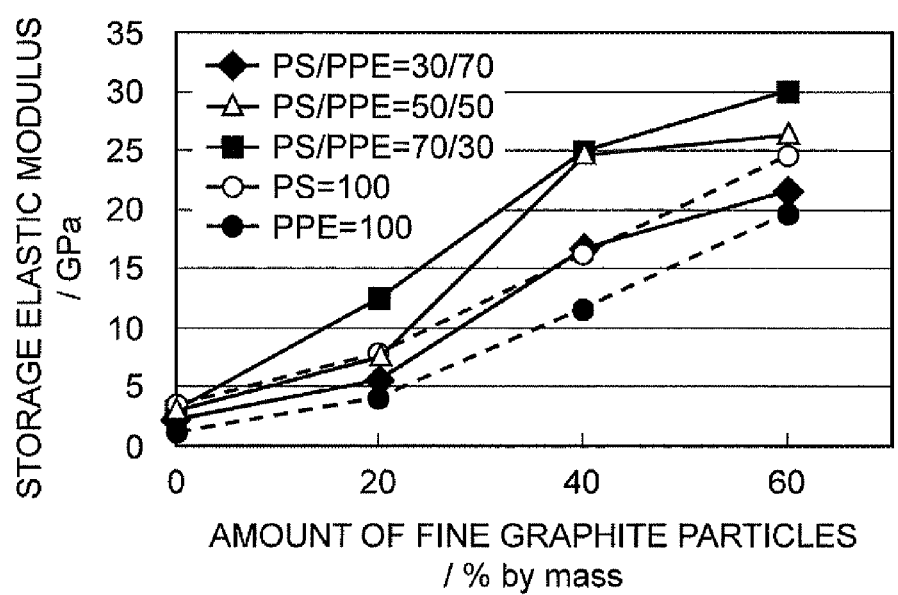

FIG. 23 is a graph showing the relationship between the amount of the fine graphite particles and the storage elastic modulus in a polystyrene-polyphenylene ether resin composite material.

Figure 24:
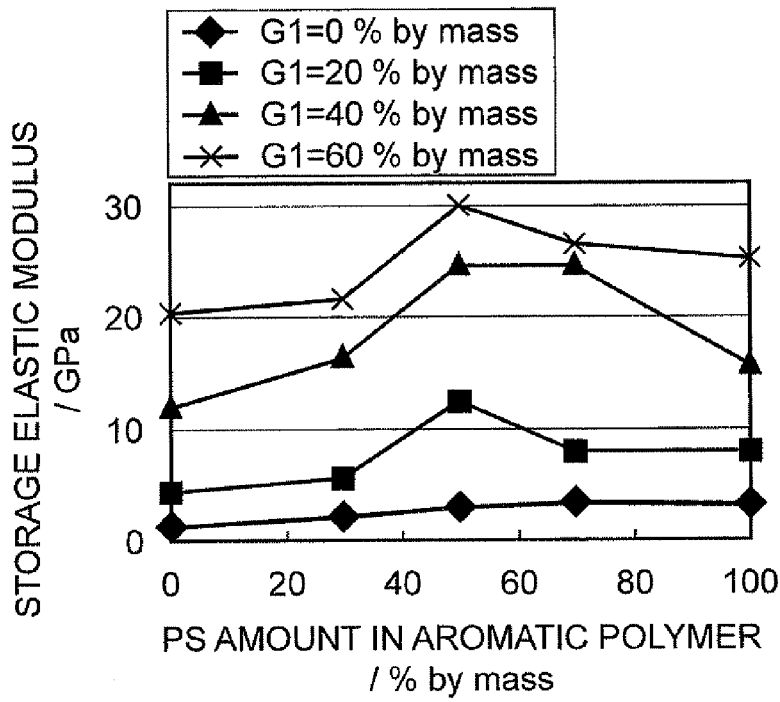

FIG. 24 is a graph showing the relationship between the polystyrene amount and the storage elastic modulus in the polystyrene-polyphenylene ether resin composite material.

Figure 25:
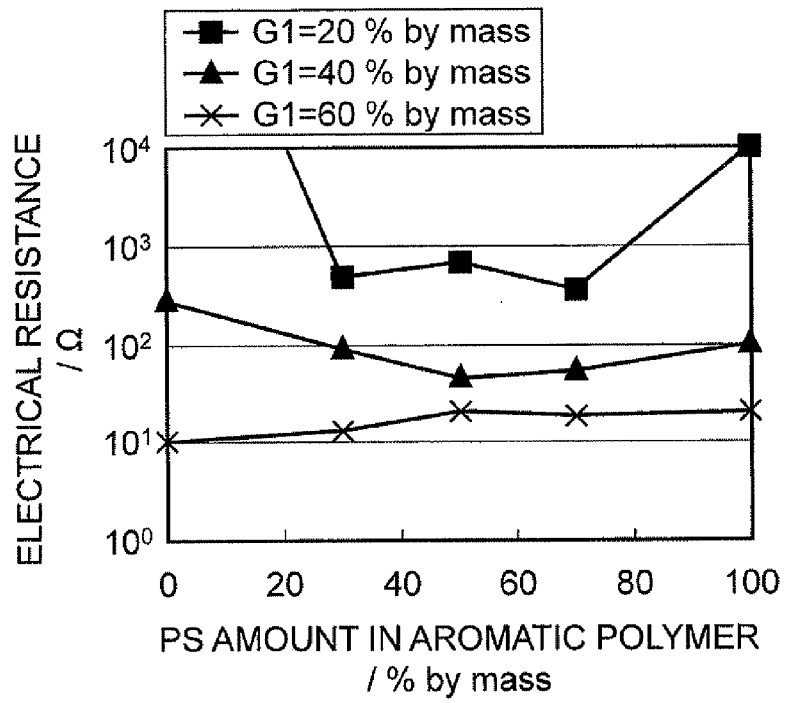

FIG. 25 is a graph showing the relationship between the polystyrene amount and the electrical resistance in the polystyrene-polyphenylene ether resin composite material.

DESCRIPTION OF EMBODIMENTS

Hereinafter, the present invention will be described in detail on the basis of preferred embodiments thereof.

A first resin composite material (hereinafter, also referred to as an "aromatic polymer composite material") of the present invention comprises: fine graphite particles comprising plate-like graphite particles and a specific aromatic vinyl copolymer adsorbed on the plate-like graphite particles; and at least one aromatic polymer selected from the group consisting of polystyrenes and polyphenylene ethers.

Meanwhile, a second resin composite material (hereinafter, also referred to as an "olefin-based resin composite material") of the present invention comprises: fine graphite particles comprising plate-like graphite particles, a specific aromatic vinyl copolymer adsorbed on the plate-like graphite particles, and at least one hydrocarbon chain, which is bonded to the aromatic vinyl copolymer, of alkyl chains, oligoolefin chains, and polyolefin chains; and an olefin-based resin.

In each of the aromatic polymer composite material and the olefin-based resin composite material, the fine graphite particles are preferably present in the aromatic polymer or the olefin-based resin in a dispersed state. In such a case, characteristics of the graphite particles such as electrical conductivity, thermal conductivity, and rigidity tend to be sufficiently imparted to the aromatic polymer or the olefin-based resin.

<Fine Graphite Particles>

First, the fine graphite particles according to the present invention are described. The fine graphite particles according to the present invention comprise plate-like graphite particles, and an aromatic vinyl copolymer adsorbed on the plate-like graphite particles. Such fine graphite particles can be highly dispersed in the aromatic polymer.

Moreover, the fine graphite particles according to the present invention preferably further comprise at least one hydrocarbon chain, which is bonded to the aromatic vinyl copolymer, of alkyl chains, oligoolefin chains, and polyolefin chains. Such fine graphite particles comprising the hydrocarbon chain can be easily dispersed in the olefin-based resin.

The plate-like graphite particles constituting the fine graphite particles are not particularly limited, but examples thereof include those obtained by grinding known graphite having a graphite structure (synthetic graphite or natural graphite (for example, flake graphite, vein graphite, or amorphous graphite)), while avoiding destruction of the graphite structure.

The thickness of the plate-like graphite particle is not particularly limited, but is preferably 0.3 to 1000 nm, more preferably 0.3 to 100 nm, and particularly preferably 1 to 100 nm. Meanwhile, the size of the plate-like graphite particle in the plane direction is not particularly limited, but, for example, the length in the major axis direction (longest diameter) is preferably 0.1 to 500 µm, and more preferably 1 to 500 µm, while the length in the minor axis direction (shortest diameter) is preferably 0.1 to 500 µm, and more preferably 0.3 to 100 µm.

Moreover, a functional group such as hydroxyl group, carboxyl group, or epoxy group is preferably bonded (more preferably covalently bonded) to a surface of the plate-like graphite particle according to the present invention. The functional group has affinity for the aromatic vinyl copolymer according to the present invention, and increases the amount and the adsorption force of the aromatic vinyl copolymer adsorbed on the plate-like graphite particles, so that the dispersibility of the fine graphite particles in the aromatic polymer (especially polystyrene) or the olefin-based resin according to the present invention tends to increase.

Such a functional group is preferably bonded to 50% or less (more preferably 20% or less, and particularly preferably 10% or less) of all carbon atoms near the surface of the plate-like graphite particle (preferably in a region from the surface to a depth of 10 nm). If the ratio of the carbon atoms to which the functional group is bonded exceeds the upper limit, the hydrophilicity of the plate-like graphite particles is increased, so that the affinity of the plate-like graphite particles for the aromatic vinyl copolymer tends to be lowered. On the other hand, the lower limit of the ratio of carbon atoms to which the functional group is bonded is not particularly limited, but is preferably 0.01% or higher. Note that the functional group such as hydroxyl group can be quantitatively measured by the X-ray photoelectron spectroscopy (XPS), and the amount of the functional group present in a region from a particle surface to a depth of 10 nm can be determined. Here, when the thickness of a plate-like graphite particle is 10 nm or less, the amount of the functional group present in the entire region of the plate-like graphite particle is measured.

The aromatic vinyl copolymer according to the present invention contains
a vinyl aromatic monomer unit represented by the following formula (1):

$$—(CH_2—CHX)— \quad (1)$$

(in the formula (1), X represents a phenyl group, a naphthyl group, an anthracenyl group, or a pyrenyl group, provided that these groups may have each a substituent); and
another monomer unit.

In the aromatic vinyl copolymer, the vinyl aromatic monomer unit exhibits an ability to adsorb on the graphite particles. Hence, the aromatic vinyl copolymer adsorbs on the plate-like graphite particles, so that the cohesive force between the plate-like graphite particles can be reduced.

Moreover, in the first resin composite material (the aromatic polymer composite material) of the present invention, the vinyl aromatic monomer unit exhibits a high affinity for the aromatic polymer (especially polystyrene) according to the present invention. Consequently, the aromatic vinyl copolymer imparts affinity for the aromatic polymer (especially polystyrene) according to the present invention to the plate-like graphite particles, so that the plate-like graphite particles can be highly dispersed in the aromatic polymer (especially polystyrene) according to the present invention. Moreover, when the other monomer unit in the aromatic polymer composite material is a polar monomer unit, the polar monomer unit exhibits affinity for the aromatic polymer (especially polystyrene) according to the present invention and for the functional group near the surface of the graphite particle. Hence, such an aromatic vinyl copolymer further reduces the cohesive force between the plate-like graphite particles by adsorbing on the plate-like graphite particles, and also imparts an increased affinity for the aromatic polymer (especially polystyrene) according to the present invention to the plate-like graphite particles, so that the plate-like graphite particles can be further highly dispersed in the aromatic polymer (especially polystyrene) according to the present invention.

Meanwhile, in the second resin composite material (the olefin-based resin composite material) of the present invention, the aromatic vinyl copolymer preferably has a functional group. This functional group makes it possible to easily introduce at least one hydrocarbon chain of alkyl chains, oligoolefin chains, and polyolefin chains into the aromatic vinyl copolymer. Examples of the functional group include an amino group, a carboxyl group, carboxylic acid ester groups, a hydroxyl group, amide groups, imino groups, a glycidyl group, and the like. Of these functional groups, an amino group is preferable. Moreover, in the aromatic vinyl copolymer having the functional group, it is successful that the functional group is present in at least one of the vinyl aromatic monomer unit and the other monomer unit. However, from the viewpoint of not impairing the ability of the aromatic vinyl copolymer to adsorb on the plate-like graphite particles, the other monomer unit preferably has the functional group. From the viewpoint that an alkyl chain, an oligoolefin chain, or a polyolefin chain can be easily introduced, the other monomer unit is more preferably another vinyl monomer unit having the functional group.

As described above, the vinyl aromatic monomer unit easily adsorbs on the graphite particles. Hence, as the proportion of the vinyl aromatic monomer unit increases in the aromatic vinyl copolymer according to the present invention, the amount of the aromatic vinyl copolymer adsorbed on the plate-like graphite particles tends to increase, and the fine graphite particles tend to have a higher dispersibility in the aromatic polymer (especially polystyrene) or the olefin-based resin according to the present invention.

The amount of the vinyl aromatic monomer unit is preferably 10 to 98% by mass, more preferably 30 to 98% by mass, and particularly preferably 50 to 95% by mass, relative to the entire aromatic vinyl copolymer. If the amount of the vinyl aromatic monomer unit is less than the lower limit, the amount of the aromatic vinyl copolymer adsorbed on the plate-like graphite particles decreases, so that the dispersibility of the fine graphite particles tends to be lowered. Meanwhile, if the amount of the vinyl aromatic monomer unit exceeds the upper limit, no affinity for the aromatic polymer (especially polystyrene) according to the present invention is imparted to the plate-like graphite particles in the aromatic polymer composite material, so that the dispersibility of the fine graphite particles tends to be lowered. Moreover, the alkyl chain, oligoolefin chain, or polyolefin chain less likely to be bonded to the aromatic vinyl copolymer, and no affinity for the olefin-based resin is imparted to the plate-like graphite particles, so that the dispersibility of the fine graphite particles tends to be lowered, in the case where the other monomer unit in the olefin-based resin composite material has the functional group.

Examples of the vinyl aromatic monomer unit according to the present invention include a styrene monomer unit, a vinylnaphthalene monomer unit, a vinylanthracene monomer unit, and a vinylpyrene monomer unit.

These vinyl aromatic monomer units may have each a substituent. Examples of the substituent, i.e., the substituent which the group represented by X in the above-described formula (1) may have, include an amino group, a carboxyl group, carboxylic acid ester groups, a hydroxyl group, amide groups, imino groups, a glycidyl group, alkoxy groups (for example, a methoxy group), a carbonyl group, imide groups, phosphate ester groups, and the like. Of these substituents, alkoxy groups such as a methoxy group are preferable, and a methoxy group is more preferable from the viewpoint that the dispersibility of the fine graphite particles is improved. In the olefin-based resin composite material, the above-exemplified functional groups are preferable, from the viewpoint that an alkyl chain, an oligoolefin chain, or a polyolefin chain can be bonded to the vinyl aromatic monomer unit. Examples of such a vinyl aromatic monomer unit having a substituent include an aminostyrene monomer unit, a vinylbenzoic acid ester monomer unit, a hydroxystyrene monomer unit, a vinylanisole monomer unit, an acetylstyrene monomer unit, and the like.

Of these substituted or unsubstituted vinyl aromatic monomer units, a styrene monomer unit, a vinylnaphthalene monomer unit, and a vinylanisole monomer unit are preferable from the viewpoint that the dispersibility of the fine graphite particles is improved. In the olefin-based resin composite material, an aminostyrene monomer unit is preferable from the viewpoint that an alkyl chain, an oligoolefin chain, or a polyolefin chain can be bonded.

The other monomer unit according to the present invention is not particularly limited. In the first resin composite material (the aromatic polymer composite material) of the present invention, the other monomer unit is preferably a polar monomer unit, and more preferably a monomer unit derived from at least one monomer selected from the group consisting of (meth)acrylic acid, (meth)acrylates, (meth)acrylamides, vinylimidazoles, vinylpyridines, maleic anhydride, and maleimides, from the viewpoint that affinity for the aromatic polymer (especially polystyrene) and for the functional group near the surface of the graphite particle according to the present invention is exhibited. The use of an aromatic vinyl copolymer containing such a polar monomer unit improves the affinity of the fine graphite particles for the aromatic polymer (especially polystyrene) according to the present invention, making it possible to highly disperse the fine graphite particles in the aromatic polymer (especially polystyrene) according to the present invention.

Meanwhile, in the second resin composite material (the olefin-based resin composite material) of the present invention, preferred is a functional group-containing vinyl monomer unit derived from at least one vinyl monomer containing the functional group selected from the group consisting of (meth)acrylic acid, (meth)acrylates, (meth)acrylamides, vinylimidazoles, and vinylpyridines. The use of an aromatic vinyl copolymer containing the other vinyl monomer unit having such a functional group makes it possible to easily introduce an alkyl chain, an oligoolefin chain, or a polyolefin chain into the aromatic vinyl copolymer. In addition, the affinity of the obtained fine graphite particles for the olefin-based resin is improved. Hence, the fine graphite particles can be easily dispersed in the olefin-based resin.

Examples of the (meth)acrylates include alkyl (meth)acrylates, substituted alkyl (meth)acrylates (for example, hydroxyalkyl (meth)acrylates such as hydroxyethyl (meth)acrylate, and aminoalkyl (meth)acrylates such as dimethylaminoethyl (meth)acrylate), and the like. Examples of the (meth)acrylamides include (meth)acrylamide, N-alkyl (meth)acrylamides, N,N-dialkyl(meth)acrylamides (for example, N,N-dimethyl(meth)acrylamide), and the like. Examples of the vinylimidazoles include 1-vinylimidazole and the like. Examples of the vinylpyridines include 2-vinylpyridine, 4-vinylpyridine, and the like. Examples of the maleimides include maleimide, alkylmaleimides (for example, methylmaleimide and ethylmaleimide), arylmaleimides (for example, phenylmaleimide), and the like.

In addition, examples of the other vinyl monomer having an amino group include aminoalkyl (meth)acrylates, vinylpyridines (for example, 2-vinylpyridine and 4-vinylpyridine), vinylimidazoles (for example, 1-vinylimidazole), and the like. An example of the other vinyl monomer having a carboxyl group is (meth)acrylic acid. Examples of the other vinyl monomer having a carboxylic acid ester group include alkyl (meth)acrylates. Examples of the other vinyl monomer having a hydroxyl group include hydroxyalkyl (meth)acrylates. Examples of the other vinyl monomer having an amide group include (meth)acrylamide, N-alkyl (meth)acrylamides, N,N-dialkyl(meth)acrylamides, and the like.

Of these other monomers, alkyl (meth)acrylates, hydroxyalkyl (meth)acrylates, aminoalkyl (meth)acrylates, N,N-dialkyl(meth)acrylamides, 2-vinylpyridine, 4-vinylpyridine, and arylmaleimides are preferable, hydroxyalkyl (meth)acrylates, N,N-dialkyl(meth)acrylamides, 2-vinylpyridine, and arylmaleimides are more preferable, and phenylmaleimide is particularly preferable in the aromatic polymer composite material, from the viewpoint that the dispersibility of the fine graphite particles is improved.

Meanwhile, in the olefin-based resin composite material, hydroxyalkyl (meth)acrylates, aminoalkyl (meth)acrylates, N,N-dialkyl (meth)acrylamides, 2-vinylpyridine, and 4-vinylpyridine are preferable, aminoalkyl (meth)acrylates, 2-vinylpyridine, and 4-vinylpyridine are more preferable, and 2-vinylpyridine is particularly preferable, from the viewpoint that an alkyl chain, an oligoolefin chain, or a polyolefin chain can be easily introduced into the aromatic vinyl copolymer.

The number average molecular weight of the aromatic vinyl copolymer in the fine graphite particles according to the present invention is not particularly limited, but is preferably 1000 to 1000000, and more preferably 5000 to 100000. If the number average molecular weight of the aromatic vinyl copolymer is less than the lower limit, the adsorption capability on the graphite particles tends to decrease. Meanwhile, if the number average molecular weight of the aromatic vinyl copolymer exceeds the upper limit, the handling tends to be difficult, because the solubility in the solvent decreases, or the viscosity remarkably increases. Note that the number average molecular weight of the aromatic vinyl copolymer is a value measured by gel permeation chromatography (column: Shodex GPC K-805L and Shodex GPC K-800RL (both manufactured by Showa Denko K. K.), eluent: chloroform), and converted by using standard polystyrene.

In addition, a random copolymer or a block copolymer may be used as the aromatic vinyl copolymer in the fine graphite particles according to the present invention. From the viewpoint that the dispersibility of the fine graphite particles is improved, a block copolymer is preferably used.

The amount of the aromatic vinyl copolymer in the fine graphite particles according to the present invention is preferably $10^{-7}$ to $10^{-1}$ parts by mass, and more preferably $10^{-5}$ to $10^{-2}$ parts by mass, relative to 100 parts by mass of the plate-like graphite particles. If the amount of the aromatic vinyl copolymer is less than the lower limit, the dispersibility of the fine graphite particles tends to be lowered, because the aromatic vinyl copolymer is adsorbed insufficiently on the plate-like graphite particles. Meanwhile, if the amount of the aromatic vinyl copolymer exceeds the upper limit, part of the aromatic vinyl copolymer tends to be present without direct adsorption on the plate-like graphite particles.

Moreover, the fine graphite particles according to the present invention preferably further comprise at least one hydrocarbon chain, which is bonded to the aromatic vinyl copolymer, of alkyl chains, oligoolefin chains, and polyolefin chains. In such a case, the surfaces of the fine graphite particles are alkylated, and exhibit an affinity for the olefin-based resin, which has a low polarity. Hence, the fine graphite particles can be easily dispersed in the olefin-based resin. Moreover, such an alkyl chain, an oligoolefin chain, or a polyolefin chains is preferably bonded to a side chain of the aromatic vinyl copolymer. Thereby, the affinity of the fine graphite particles for the olefin-based resin tends to be further improved.

In such fine graphite particles, the alkyl chains, the oligoolefin chains, and the polyolefin chains are preferably those each formed by reacting the aromatic vinyl copolymer having the functional group with an alkyl compound, oligoolefin, or polyolefin having a moiety reactive with the functional group (hereinafter referred to as a "reactive moiety"), and bonding the reactive moiety of the alkyl compound, oligoolefin, or polyolefin to the functional group of the aromatic vinyl copolymer.

Examples of the reactive moiety include halogen atoms (such as a chlorine atom, a bromine atom, and an iodine atom), a carboxyl group, carboxylic anhydride groups (such as a maleic anhydride group), a sulfonic acid group, an aldehyde group, a glycidyl group, and the like. From the viewpoint of a high reactivity with the functional group, halogen atoms, a carboxyl group, and carboxylic anhydride groups are preferable, halogen atoms are more preferable, and a chlorine atom is further preferable. Further, the combination of the functional group with the reactive moiety is preferably a combination of an amino group with a halogen atom or a combination of an amino group with a carboxyl group or a carboxylic anhydride group, more preferably a combination of an amino group with a chlorine atom or a combination of an amino group with a maleic anhydride group, and particularly preferably a combination of an amino group with a chlorine atom, from the viewpoint that the reactivity therebetween is high.

The alkyl compound, oligoolefin, and polyolefin each having such a reactive moiety are not particularly limited, but are preferably an alkyl compound, oligoolefin, and polyolefin each having the functional group at a terminal of the molecule (hereinafter referred to as a "terminal functional group-containing alkyl compound", a "terminal functional group-containing oligoolefin" and a "terminal functional group-containing polyolefin," respectively). Such a terminal functional group-containing alkyl compound, a terminal functional group-containing oligoolefin, and a terminal functional group-containing polyolefin are reactive with the aromatic vinyl copolymer having the functional group, and hence the alkyl chain, oligoolefin chain, or polyolefin chain can be easily introduced into the aromatic vinyl copolymer.

Specific examples of the alkyl compounds, oligoolefins, and polyolefins each having the reactive moiety include chlorinated products, brominated products, hydroxyl group-containing products, maleic acid-modified products, and (meth)acrylic acid-modified products of alkyl compounds, oligoolefins, and polyolefins, and the like. Of these examples, products chlorinated at a terminal and products containing a terminal hydroxyl group are preferable, and products chlorinated at a terminal are more preferable. The kinds of the oligoolefin and polyolefin are not particularly limited, but an ethylene oligomer, polyethylene, a propylene oligomer, polypropylene, and an ethylene-propylene copolymer (an oligomer and a polymer) are preferable from the viewpoint that the oligoolefin chain or the polyolefin chain is easily introduced.

The number average molecular weight of such a polyolefin having the reactive moiety is not particularly limited, but is preferably 100 to 1000000, and more preferably 1000 to 10000. If the number average molecular weight of the polyolefin is less than the lower limit, the introduced polyolefin chain is so short that the affinity of the fine graphite particles for the olefin-based resin tends to be improved insufficiently. Meanwhile, if the number average molecular weight of the polyolefin exceeds the upper limit, the polyolefin chain tends to be difficult to introduce, because the polyolefin is not bonded to the aromatic vinyl copolymer easily. Likewise, the molecular weight of the alkyl compound having the reactive moiety is not particularly limited, but is preferably 70 to 500. In addition, the number average molecular weight of the oligoolefin having the reactive moiety is not particularly limited, but is preferably 100 to 5000.

As described above, the fine graphite particles according to the present invention have a high affinity for the aromatic polymer (especially polystyrene) or the olefin-based resin according to the present invention, and are highly or easily dispersed in the aromatic polymer (especially polystyrene) or the olefin-based resin in the resin composite material of the present invention. In addition, the fine graphite particles have an excellent dispersibility in a solvent. For example, when the resin composite material of the present invention is produced by mixing the fine graphite particles with the aromatic polymer or the olefin-based resin according to the present invention in a solvent, as described later, the fine graphite particles can be highly or easily dispersed in the solvent, and the resin composite material of the present invention can be easily obtained in which the fine graphite particles are uniformly dispersed in the aromatic polymer or the olefin-based resin according to the present invention.

Next, a method for producing the fine graphite particles according to the present invention is described. The fine graphite particles according to the present invention can be produced by mixing graphite particles, which are a raw material, the aromatic vinyl copolymer containing the vinyl aromatic monomer unit represented by the above-described formula (1), a peroxyhydrate, and a solvent, subjecting the obtained mixture to a grinding treatment, and then removing the solvent. Moreover, the fine graphite particles comprising the hydrocarbon chain according to the present invention can be produced by further introducing at least one hydrocarbon chain of alkyl chains, oligoolefin chains, and polyolefin chains into the aromatic vinyl copolymer in the fine graphite particles after the grinding treatment.

Examples of the graphite particles (hereinafter, referred to as "raw material graphite particles") used as a raw material for production of the fine graphite particles according to the present invention include known graphite having a graphite structure (synthetic graphite and natural graphite (for example, flake graphite, vein graphite, and amorphous graphite)). In particular, preferred are those from which plate-like graphite particles having the thickness in the above-described range can be obtained by grinding. The particle diameter of the raw material graphite particle is not particularly limited, but is preferably 0.01 to 5 mm, and more preferably 0.1 to 1 mm.

Moreover, it is preferable that a functional group such as hydroxyl group, carboxyl group, or epoxy group be bonded (preferably covalently bonded) to each surface of the plate-like graphite particles constituting the raw material graphite particles. The functional group has affinity for the aromatic vinyl copolymer, and increases the amount and the adsorption force of the aromatic vinyl copolymer adsorbed on the plate-like graphite particles. As a result, the obtained fine graphite particles tend to have a high dispersibility in the aromatic polymer (especially polystyrene) according to the present invention in the first resin composite material (the aromatic polymer composite material) of the present invention. Meanwhile, in the second resin composite material (the olefin-based resin composite material) of the present invention, the obtained fine graphite particles tend to have an improved affinity for the olefin-based resin, and an increased dispersibility therein, because the amount of the alkyl chain, oligoolefin chain, or polyolefin chain introduced is increased.

Such a functional group is preferably bonded to 50% or less (more preferably 20% or less, and particularly preferably 10% or less) of all carbon atoms near the surface of the plate-like graphite particle (preferably in a region from the surface to a depth of 10 nm). If the ratio of the carbon atoms to which the functional group is bonded exceeds the upper limit, the hydrophilicity of the plate-like graphite particles is increased, so that the affinity of the plate-like graphite particles for the aromatic vinyl copolymer tends to be lowered. Meanwhile, the lower limit of the ratio of the carbon atoms to which the functional group is bonded is not particularly limited, but is preferably 0.01% or higher.

Meanwhile, examples of the peroxyhydrate used for producing the fine graphite particles include complexes of hydrogen peroxide with a compound having a carbonyl group (for example, urea, a carboxylic acid (benzoic acid, salicylic acid, or the like), a ketone (acetone, methyl ethyl ketone, or the like), or a carboxylic acid ester (methyl benzoate, ethyl salicylate, or the like)); those in which hydrogen peroxide is coordinated to a compound such as a quaternary ammonium salt, potassium fluoride, rubidium carbonate, phosphoric acid, or uric acid; and the like. Such a peroxyhydrate acts as an oxidizing agent in the production of the fine graphite particles according to the present invention, and facilitates the exfoliation of carbon layers, without destruction of the graphite structure of the raw material graphite particles. In other words, the peroxyhydrate is intercalated between carbon layers, and causes the cleavage to proceed, while oxidizing the surfaces of the layers. Simultaneously, the aromatic vinyl copolymer is intercalated between the cleaved carbon layers to stabilize the cleavage surfaces. Thus, the interlayer exfoliation is promoted. Consequently, in the aromatic polymer composite material, the aromatic vinyl copolymer is adsorbed on the surfaces of the plate-like graphite particles, making it possible to highly disperse the fine graphite particles in the aromatic polymer (especially polystyrene) according to the present invention. Meanwhile, in the olefin-based resin composite material, the fine graphite particles can be easily dispersed in the olefin-based resin when an alkyl chain, oligoolefin chain, or polyolefin chain is bonded to the aromatic vinyl copolymer.

The solvent used for producing the fine graphite particles is not particularly limited, but preferred are dimethylformamide (DMF), chloroform, dichloromethane, chlorobenzene, dichlorobenzene, N-methylpyrrolidone (NMP), hexane, toluene, dioxane, propanol, γ-picoline, acetonitrile, dimethyl sulfoxide (DMSO), and dimethylacetamide (DMAC), and more preferred are dimethylformamide (DMF), chloroform, dichloromethane, chlorobenzene, dichlorobenzene, N-methylpyrrolidone (NMP), hexane, and toluene.

In the production of the fine graphite particles according to the present invention, first, the raw material graphite particles, the aromatic vinyl copolymer, the peroxyhydrate, and the solvent are mixed (a mixing step). The amount of the raw material graphite particles mixed per liter of the solvent is preferably 0.1 to 500 g/L, and more preferably 10 to 200 g/L. If the amount of the raw material graphite particles mixed is less than the lower limit, such an amount tends to be economically disadvantageous, because the amount of the solvent consumed increases. Meanwhile, if the amount of the raw material graphite particles mixed exceeds the upper limit, handling of the liquid tends to be difficult, because the viscosity of the liquid increases.

Meanwhile, the amount of the aromatic vinyl copolymer mixed is preferably 0.1 to 1000 parts by mass, and more preferably 0.1 to 200 parts by mass, relative to 100 parts by mass of the raw material graphite particles. If the amount of the aromatic vinyl copolymer mixed is less than the lower limit, the dispersibility of the obtained fine graphite particles in the aromatic polymer (especially polystyrene) or the olefin-based resin according to the present invention tends to be lowered. Meanwhile, if the amount of the aromatic vinyl copolymer mixed exceeds the upper limit, handling of the liquid tends to be difficult, because the aromatic vinyl copolymer is not dissolved in the solvent, and the viscosity of the liquid increases.

Moreover, the amount of the peroxyhydrate mixed is preferably 0.1 to 500 parts by mass, and more preferably 1 to 100 parts by mass, relative to 100 parts by mass of the raw material graphite particles. If the amount of the peroxyhydrate mixed is less than the lower limit, the dispersibility of the obtained fine graphite particles tends to be lowered. Meanwhile, if the amount of the peroxyhydrate mixed exceeds the upper limit, the electrical conductivity of the obtained fine graphite particles tends to be lowered, because the raw material graphite particles are excessively oxidized.

Next, the mixture obtained in the mixing step is subjected to a grinding treatment, so that the raw material graphite particles are ground into plate-like graphite particles (a grinding step). As a result, the aromatic vinyl copolymer adsorbs on the surfaces of the produced plate-like graphite particles. Hence, the dispersion stability of the fine graphite particles in the aromatic polymer (especially polystyrene) according to the present invention is improved in the aromatic polymer composite material.

Examples of the grinding treatment according to the present invention include an ultrasonic wave treatment (the oscillation frequency is preferably 15 to 400 kHz, and the output power is preferably 500 W or less), a treatment using a ball mill, wet grinding, blasting, mechanical grinding, and the like. This grinding treatment makes it possible to grind the raw material graphite particles without destruction of the graphite structure of the raw material graphite particles to obtain the plate-like graphite particles. In addition, the temperature of the grinding treatment is not particularly limited, but may be −20 to 100° C., for example. Moreover, the grinding treatment time is not particularly limited, but may be 0.01 to 50 hours, for example.

The thus obtained fine graphite particles are in a state of being dispersed in the solvent, and can be collected by removing the solvent with filtration, centrifugation, or the like.

On the other hand, in the production of the fine graphite particles comprising the hydrocarbon chain, at least one hydrocarbon chain of alkyl chains, oligoolefin chains, and polyolefin chains is introduced into the aromatic vinyl copolymer in the fine graphite particles by mixing the fine graphite particles obtained in the grinding step with at least one of the above-described alkyl compounds, oligoolefins, and polyolefins which each have the reactive moiety (a hydrocarbon chain introduction step). In this case, the aromatic vinyl copolymer has to have a functional group, and the at least one hydrocarbon chain of alkyl chains, oligoolefin chains, and polyolefin chains is introduced into the aromatic vinyl copolymer by bonding between this functional group and the reactive moiety.

In this hydrocarbon chain introduction step, the fine graphite particles obtained in the grinding step, at least one of the above-described alkyl compounds, oligoolefins, and polyolefins each having the reactive moiety, and a solvent are mixed, and, if necessary, the obtained mixture is heated. Thus, the aromatic vinyl copolymer having the functional group and the at least one of the alkyl compounds, the oligoolefins, and the polyolefins each having the reactive moiety are reacted with each other. The solvent is not particularly limited, but the above-exemplified solvent can be used. In addition, the reaction temperature is preferably −10 to 150° C., and the reaction time is preferably 0.1 to 10 hours.

In the hydrocarbon chain introduction step, the amount of the fine graphite particles mixed per liter of the solvent is preferably 1 to 200 g/L, and more preferably 1 to 50 g/L. If the amount of the fine graphite particles mixed is less than the lower limit, such an amount tends to be economically disadvantageous, because the amount of the solvent consumed increases. Meanwhile, if the amount of the fine graphite particles mixed exceeds the upper limit, handling of the liquid tends to be difficult, because the viscosity of the liquid increases.

Meanwhile, the amount of the alkyl compound, the oligoolefin, or the polyolefin having the reactive moiety mixed is preferably 0.001 to 500 parts by mass, and more preferably 10 to 500 parts by mass, relative to 100 parts by mass of the fine graphite particles. If the amount of the alkyl compound, the oligoolefin, or the polyolefin mixed is less than the lower limit, the amount of the alkyl chain, the oligoolefin chain, or the polyolefin chain introduced is so small that the dispersibility of the fine graphite particles in the olefin-based resin tends to be improved insufficiently. Meanwhile, if the amount of the alkyl compound, the oligoolefin, or the polyolefin mixed exceeds the upper limit, handling of the liquid tends to be difficult, because the viscosity of the liquid increases.

The fine graphite particles according to the present invention into which the alkyl chain, the oligoolefin chain, or the polyolefin chain is introduced are in a state of being dispersed in the solvent, and can be collected by removing the solvent with filtration, centrifugation, or the like.

<Aromatic Polymer>

Next, the aromatic polymer according to the present invention is described. The aromatic polymer according to the present invention is at least one polymer selected from the group consisting of polystyrenes and polyphenylene ethers.

Examples of the polystyrenes include a homopolymer of styrene; homopolymers of a styrene having a substituent on an aromatic ring therein such as 4-methylstyrene, 4-hydroxystyrene, or 4-aminostyrene; copolymers of styrene and the styrene having the substituent on an aromatic ring therein; and the like. Meanwhile, examples of the polyphenylene ethers include polyphenylene oxides each having a substituent such as an alkyl group on an aromatic ring therein typified by poly(1,4-phenylene oxide) and poly(2,6-dimethyl-1,4-phenylene oxide); and the like.

The number average molecular weight of the aromatic polymer such as a polystyrene or a polyphenylene ether is not particularly limited, but is preferably 1000 to 1000000, and more preferably 10000 to 1000000. If the number average molecular weight of the aromatic polymer is less than the lower limit, the mechanical strength of the first resin composite material (the aromatic polymer composite material) of the present invention tends to decrease. Meanwhile, if the number average molecular weight of the aromatic polymer exceeds the upper limit, the viscosity is so high that it tends to be difficult to mold the aromatic polymer resin composite material. Note that the number average molecular weight of the aromatic polymer according to the present invention is a value measured by gel permeation chromatography (column: Shodex GPC K-805L and Shodex GPC K-800RL (both manufactured by Showa Denko K. K.), eluent: chloroform), and converted by using standard polystyrene.

<Olefin-Based Resin>

The olefin-based resin according to the present invention is also described. In the present invention, the olefin-based resin is not particularly limited, but it is possible to use a known olefin-based resin such as low density polyethylene (LDPE), high density polyethylene (HDPE), polypropylene, an ethylene-propylene copolymer, an ethylene-acrylic copolymer, a propylene-acrylic copolymer, polyisoprene, Neoprene, polybutadiene, or an alicyclic olefin polymer.

The weight average molecular weight of such an olefin-based resin is not particularly limited, but is preferably 5000 to 1000000. If the weight average molecular weight of the olefin-based resin is less than the lower limit, the mechanical strength of the second resin composite material (the olefin-based resin composite material) of the present invention tends to decrease. Meanwhile, if the weight average molecular weight of the olefin-based resin exceeds the upper limit, the viscosity is so high that it tends to be difficult to mold the olefin-based resin composite material.

Moreover, the melt flow index of the olefin-based resin is not particularly limited, but is preferably 1 to 100 g/min (at 190° C. (polyethylene) or 230° C. (polypropylene), with a load of 2.16 kg). If the melt flow index of the olefin-based resin is less than the lower limit, the fluidity is so low that it tends to be difficult to mold the olefin-based resin composite material. Meanwhile, if the melt flow index of the olefin-based resin exceeds the upper limit, the fluidity is so high that it tends to be difficult to stably mold the olefin-based resin composite material.

<Resin Composite Material>

The first resin composite material (the aromatic polymer composite material) of the present invention comprises the fine graphite particles, and at least one aromatic polymer selected from the group consisting of polystyrenes and polyphenylene ethers. This inclusion of the fine graphite particles according to the present invention makes it possible to impart a high rigidity and a high electrical conductivity to the aromatic polymer, while a high heat resistance is maintained.

Meanwhile, the second resin composite material (the olefin-based resin composite material) of the present invention comprises the fine graphite particles and the olefin-based resin. This inclusion of the fine graphite particles according to the present invention makes it possible to impart electrical conductivity, thermal conductivity, a high elastic modulus, a high strength, a high rigidity, slidability, and a low linear expansion to the olefin-based resin.

In the aromatic polymer composite material and the olefin-based resin composite material, the amount of the fine graphite particles is not particularly limited, but is preferably 0.1 to 80% by mass, more preferably 1 to 50% by mass, and particularly preferably 1 to 30% by mass, relative to the entire resin composite material. If the amount of the fine graphite particles is less than the lower limit, the above-described characteristics of the resin composite material tend to deteriorate. Meanwhile, if the amount of the fine graphite particles exceeds the upper limit, it tends to be difficult to mold the resin composite material. Here, the storage elastic modulus can be increased and the electrical resistance can be reduced by increasing the amount of the fine graphite particles within the range. However, the storage elastic modulus tends to take a substantially constant value in an amount of the fine graphite particles exceeding 60% by mass.

In the aromatic polymer composite material, moreover, although it is possible to use only one of a polystyrene and a polyphenylene ether as the aromatic polymer, a mixture of polystyrene with polyphenylene ether is also preferably used from the viewpoint that the rigidity and the electrical conductivity are further increased. In addition, since a polystyrene and a polyphenylene ether are completely miscible with each other, the heat resistance of the aromatic polymer composite material tends to be improved, when such a mixture is used. The amount of the polystyrene in such a mixture is not particularly limited, but is preferably 20 to 80% by mass, and more preferably 30 to 70% by mass relative to the entire mixture, from the viewpoint that the rigidity and the electrical conductivity are further increased.

As described above, a high rigidity and a high electrical conductivity can be achieved in the aromatic polymer composite material by adjusting the amount of the fine graphite particles and the ratio of the polystyrene and the polyphenylene ether mixed with each other. Consequently, the aromatic polymer composite material can have a storage elastic modulus at 40° C. of preferably 2 GPa or higher, more preferably 5 GPa or higher, and particularly preferably 10 GPa or higher. Meanwhile, the surface electrical resistance per unit length can be preferably $10^4$ Ω/cm or lower, more preferably $10^3$ Ω/cm or lower, and particularly preferably $10^2$ Ω/cm or lower.

Such a resin composite material of the present invention can be produced, for example, by mixing the fine graphite particles and the aromatic polymer or the olefin-based resin according to the present invention at a prescribed ratio. At this time, the mixing may be performed by kneading (preferably melt kneading), or may be conducted in a solvent. The solvent is not particularly limited, but one exemplified as a solvent used for producing the fine graphite particles according to the present invention can be used.

When the fine graphite particles and the aromatic polymer or the olefin-based resin according to the present invention are mixed with each other in a solvent, the aromatic polymer or the olefin-based resin is dissolved in the solvent, and a uniform state is achieved. Moreover, the fine graphite particles are also highly dispersed in the solvent, and this facilitates the mixing of the fine graphite particles with the aromatic polymer or the olefin-based resin. Hence, a uniform and high-dispersion liquid can be obtained easily. Further, by subjecting the obtained dispersion liquid to an ultrasonic wave treatment, the uniformity of the dispersion liquid tends to be further improved. Then, the resin composite material of the present invention in which the fine graphite particles are highly dispersed in the aromatic polymer or the olefin-based resin can be obtained by removing the solvent from the thus obtained dispersion liquid.

EXAMPLES

Hereinafter, the present invention will be described more specifically on the basis of Examples and Comparative Examples. However, the present invention is not limited to Examples below. Note that the number average molecular weight (Mn) of each aromatic vinyl copolymer was measured by using a gel permeation chromatograph ("Shodex GPC101" manufactured by Showa Denko K. K.) under the following conditions.

<Conditions for Measurement of Aromatic Vinyl Copolymer>

Column: Shodex GPC K-805L and Shodex GPC K-800RL (both manufactured by Showa Denko K. K.)

Eluent: chloroform measuring temperature: 25° C.

Sample concentration: 0.1 mg/ml

Detection means: RI

Note that a value converted by using standard polystyrene is shown as the number average molecular weight (Mn) of each aromatic vinyl copolymer.

Example 1

<Preparation of Fine Graphite Particles>

18 g of styrene (ST), 2 g of 2-vinylpyridine (2VP), 50 mg of azobisisobutyronitrile, and 100 ml of toluene were mixed, and a polymerization reaction was performed under a nitrogen atmosphere at 85° C. for 6 hours. After cooling, purification was performed by reprecipitation using chloroform-hexane, followed by vacuum drying. Thus, 3.3 g of a ST-2VP (9:1) random copolymer (Mn=25000) was obtained.

20 mg of graphite particles ("EXP-P" manufactured by Nippon Graphite Industries, ltd., particle diameters: 100 to 600 μm), 80 mg of urea-hydrogen peroxide inclusion complex, 20 mg of the ST-2VP (9:1) random copolymer, and 2 ml of N,N-dimethylformamide (DMF) were mixed, and subjected to an ultrasonic wave treatment (output power: 250 W) at room temperature for 5 hours. Thus, a graphite particle-dispersed liquid was obtained. The graphite particle-dispersed liquid was allowed to stand still for 24 hours, and then visually observed. The graphite particles were not precipitated, and the obtained dispersion liquid was excellent in dispersion stability. Moreover, the fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine particles with lengths of 1 to 20 μm, widths of 1 to 20 μm, and thicknesses of 10 to 50 nm.

<Alkylation of Fine Graphite Particles>

4.59 g of a terminal-hydroxyl group-containing polyolefin ("Epol®" manufactured by Idemitsu Kosan Company, Limited), 1.1 g of triphenylphosphine, and 40 ml of carbon tetrachloride were mixed, and heated under reflux for 12 hours with string under a nitrogen atmosphere at 80° C. Thus, a terminal-chlorinated polyolefin was synthesized. After the heating under reflux, the solution was evaporated, and then the terminal-chlorinated polyolefin was extracted with hexane. After that, purification was conducted by silica gel chromatography (solvent: hexane). Thus, 1.5 g of the terminal-chlorinated polyolefin (Mn=2000 (catalog value)) was obtained.

Next, 20 mg of this terminal-chlorinated polyolefin, 10 mg of the fine graphite particles, and 1 ml of toluene were mixed, and stirred under a nitrogen atmosphere at 100° C. for 6 hours. The obtained dispersion liquid was filtered, and the filter cake was washed with toluene. Thus, fine graphite particles treated with the terminal-chlorinated polyolefin were obtained.

<Preparation of Second Resin Composite Material>

0.2 g of the fine graphite particles treated with the terminal-chlorinated polyolefin was kneaded with 20 g of isotactic polypropylene (PP, manufactured by Aldrich, weight average molecular weight: 190000) at 190° C. for 5 minutes by using a kneader (MINI LAB). Thus, a PP resin composite material was obtained.

Moreover, 0.2 g of the fine graphite particles treated with the terminal-chlorinated polyolefin was kneaded with 20 g of high density polyethylene (HDPE, manufactured by Aldrich, melt flow index: 12 g/min (190° C., 2.16 kg-load)) at 190° C. for 5 minutes by using a kneader (MINI LAB). Thus, a HDPE resin composite material was obtained.

Example 2

0.61 g of a ST-DMAMA (9:1) random copolymer (Mn=32000) was obtained in the same manner as in Example 1, except that 0.2 g of 2-dimethylaminoethyl methacrylate (DMAMA) was used instead of 2-vinylpyridine, the amount of styrene (ST) was changed to 1.8 g, the amount of azobisisobutyronitrile was changed to 8 mg, and the amount of toluene was changed to 10 ml.

A graphite particle-dispersed liquid was obtained in the same manner as in Example 1, except that 0.1 g of this ST-DMAMA (9:1) random copolymer was used instead of the ST-2VP (9:1) random copolymer, the amount of the graphite particles was changed to 1 g, the amount of the urea-hydrogen peroxide inclusion complex was changed to 1 g, and the amount of DMF was changed to 50 ml. The graphite particle-dispersed liquid was allowed to stand still for 24 hours, and then visually observed. The graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were prepared, and further a PP resin composite material and a HDPE resin composite material were prepared in the same manner as in Example 1, except that 10 mg of the fine graphite particles were used.

Example 3

0.73 g of ST-4VP (9:1) random copolymer (Mn=18000) was obtained in the same manner as in Example 2, except that 0.2 g of 4-vinylpyridine (4VP) was used instead of the 2-dimethylaminoethyl methacrylate, and the amount of toluene was changed to 7.5 ml.

A graphite particle-dispersed liquid was obtained in the same manner as in Example 1, except that 0.1 g of this ST-4VP (9:1) random copolymer was used instead of the ST-2VP (9:1) random copolymer. The graphite particle-dispersed liquid was allowed to stand still for 24 hours, and then visually observed. The graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were prepared, and further a PP resin composite material and a HDPE resin composite material were prepared in the same manner as in Example 1, except that 10 mg of the fine graphite particles were used.

Example 4

Fine graphite particles treated with a chlorinated polypropylene were prepared, and further a PP resin composite material and a HDPE resin composite material were prepared in the same manner as in Example 1, except that 20 mg of a chlorinated polypropylene (Manufactured by Aldrich, Mn=100000) was used instead of the terminal-chlorinated polyolefin.

Example 5

Fine graphite particles treated with a maleic anhydride-modified polypropylene were prepared, and further a PP resin composite material and a HDPE resin composite material were prepared in the same manner as in Example 1, except that 20 mg of a maleic anhydride-modified polypropylene ("LICOCENE MA®" manufactured by Clariant, viscosity (140° C.)=300 mPa·s) was used instead of the terminal-chlorinated polyolefin.

Example 6

12.5 g of graphite particles ("EXP-P" manufactured by Nippon Graphite Industries, ltd., particle diameters: 100 to 600 μm), 12.5 g of urea-hydrogen peroxide inclusion complex, 1.25 g of a ST-2VP (9:1) random copolymer prepared in the same manner as in Example 1, and 500 ml of DMF were mixed, and subjected to a wet grinding treatment 10 times using a wet type atomization unit ("STARBURST LAB" manufactured by SUGINO MACHINE LIMITED) under conditions of room temperature and a cylinder pressure of 200 MPa. Thus, a graphite particle-dispersed liquid was obtained. The graphite particle-dispersed liquid was allowed to stand still for 24 hours, and then visually observed. The graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were prepared, and further a PP resin composite material and a HDPE resin composite material were prepared in the same manner as in Example 1, except that 10 mg of the fine graphite particles were used.

Comparative Example 1

25.6 g of a ST-PM (9:1) random copolymer (Mn=37000) was obtained in the same manner as in Example 1, except that 4 g of N-phenylmaleimide (PM) was used instead of the 2-vinylpyridine, the amount of styrene (ST) was changed to 36 g, the amount of azobisisobutyronitrile was changed to 100 mg, and the amount of toluene was changed to 50 ml.

A graphite particle-dispersed liquid was obtained in the same manner as in Example 1, except that 0.7 g of this ST-PM (9:1) random copolymer was used instead of the ST-2VP (9:1) random copolymer, the amount of the graphite particles was changed to 7 g, the amount of the urea-hydrogen peroxide inclusion complex was changed to 7 g, and the amount of DMF was changed to 300 ml. The graphite particle-dispersed liquid was allowed to stand still for 24 hours, and then visually observed. The graphite particles were not precipitated, and the obtained dispersion liquid was excellent in dispersion stability.

The fine graphite particles were collected by filtering the obtained graphite particle-dispersed liquid, and washing the filter cake with DMF, followed by vacuum drying. Observation of the fine graphite particles with a scanning electron microscope (SEM) showed that the fine graphite particles were plate-like fine graphite particles with lengths of 1 to 20 μm, widths of 1 to 20 μm, and thicknesses of 10 to 50 nm.

Fine graphite particles treated with the terminal-chlorinated polyolefin were prepared, and further a PP resin composite material and a HDPE resin composite material were prepared in the same manner as in Example 1, except that 10 mg of the fine graphite particles were used.

<Observation with Optical Microscope>

Figure 1:
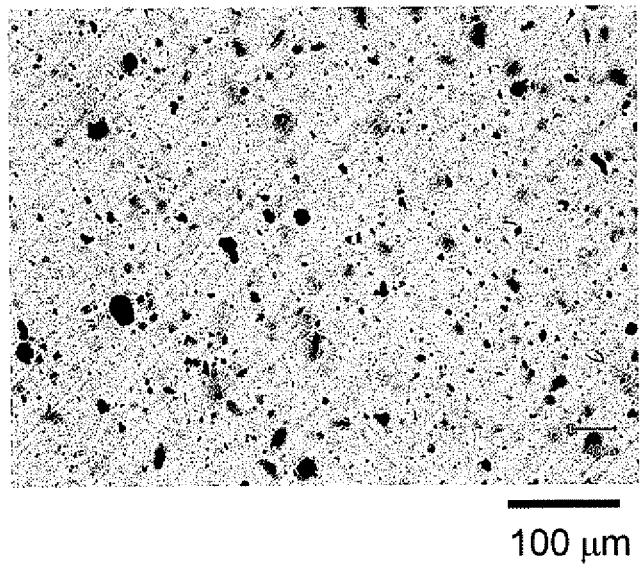
FIG. 1 is an optical micrograph of a PP resin composite material prepared in Example 1.
Figure 2:
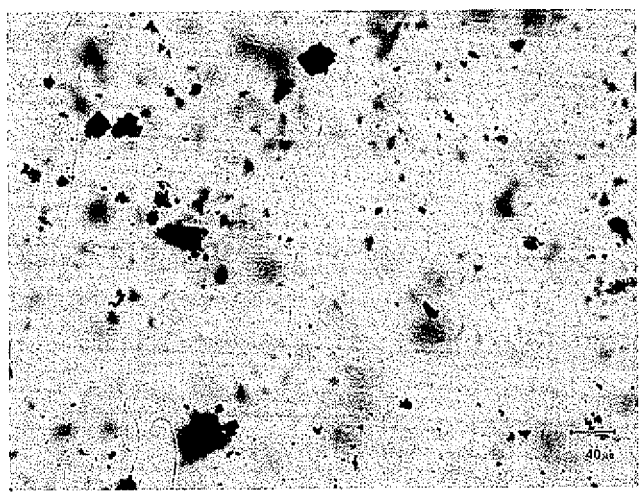
FIG. 2 is an optical micrograph of a PP resin composite material prepared in Example 2.
Figure 3:
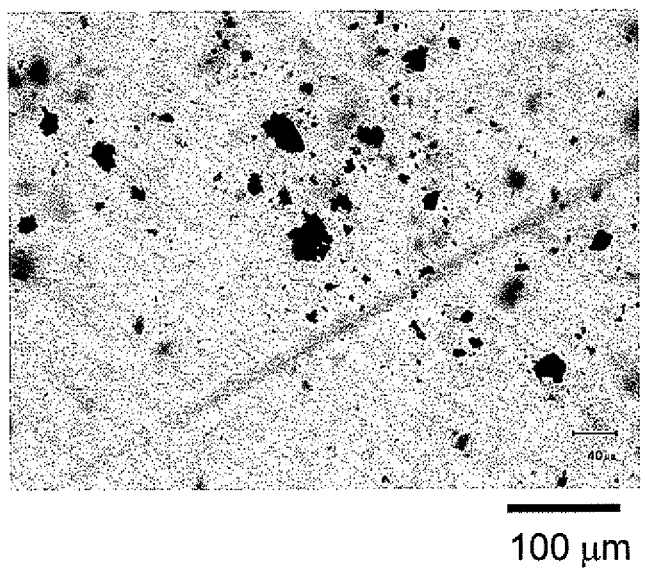
FIG. 3 is an optical micrograph of a PP resin composite material prepared in Example 3.
Figure 4:
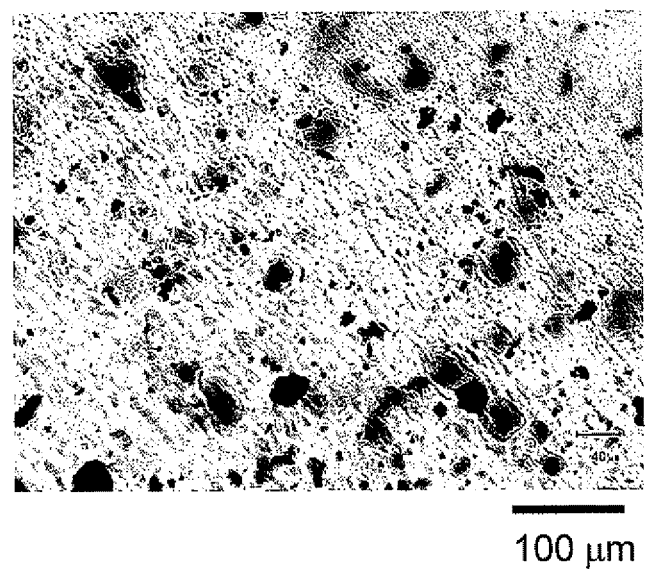
FIG. 4 is an optical micrograph of a PP resin composite material prepared in Example 4.
Figure 5:
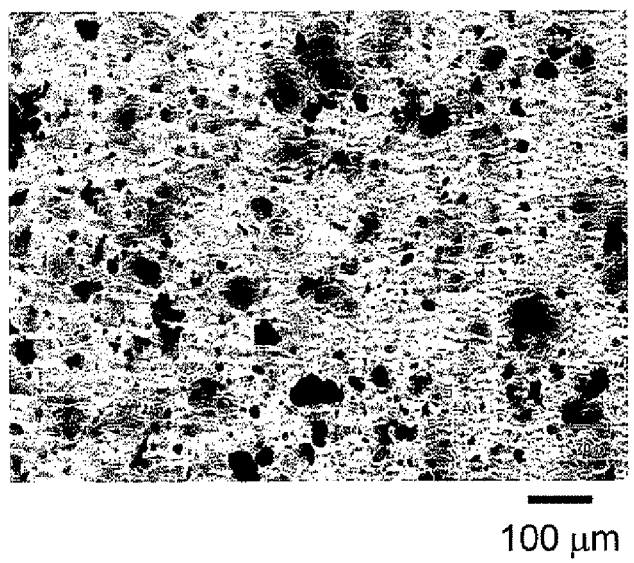
FIG. 5 is an optical micrograph of a PP resin composite material prepared in Example 5.
Figure 6A:
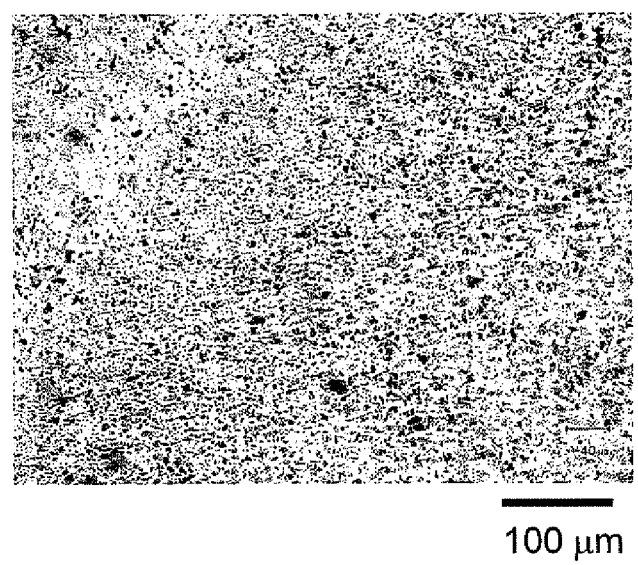
FIG. 6A is an optical micrograph of a PP resin composite material prepared in Example 6.
Figure 6B:
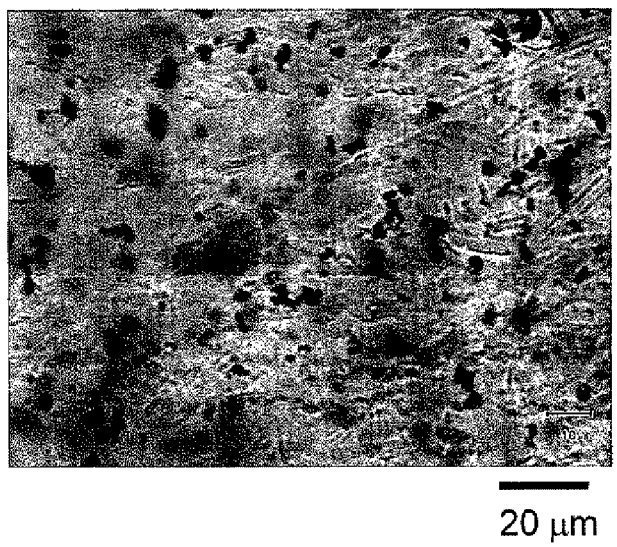
FIG. 6B is an optical micrograph of the PP resin composite material prepared in Example 6.
Figure 7:
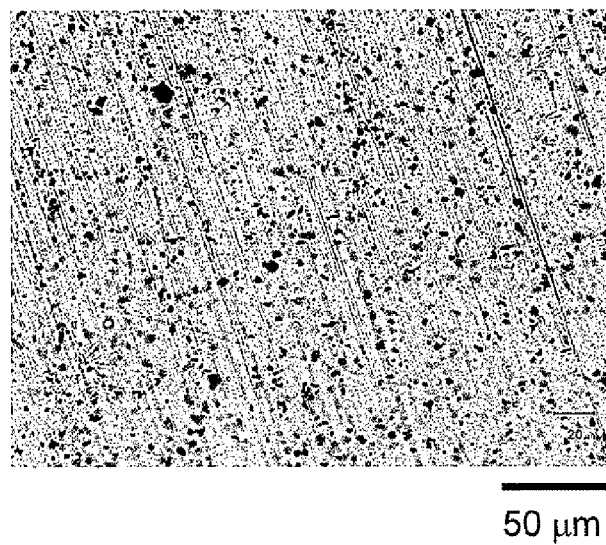
FIG. 7 is an optical micrograph of a HDPE resin composite material prepared in Example 6.
Figure 8:
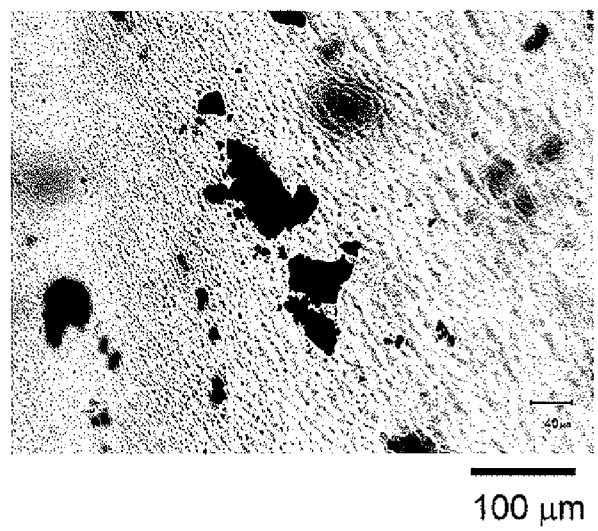
FIG. 8 is an optical micrograph of a PP resin composite material prepared in Comparative Example 1.

The PP resin composite materials and the HDPE resin composite materials obtained in Examples 1 to 6 and Comparative Example 1 were subjected to hot press at 190° C. and 40 kg/cm². Thus, thin films each having a thickness of 0.5 mm were prepared. The thin films were observed with an optical microscope. FIGS. 1 to 6 and 8 show optical micrographs of the PP resin composite materials obtained in Examples 1 to 6 and Comparative Example 1, respectively. FIG. 7 shows an optical micrograph of the HDPE resin composite material obtained in Example 6. Further, the dispersibility of the fine graphite particles in the PP resin composite materials and the HDPE resin composite materials was evaluated on the basis of these photographs. Table 1 shows the results.

TABLE 1

|  | Aromatic vinyl copolymer | Polyolefin | Dispersion treatment | Dispersibility of fine graphite particles | |
|---|---|---|---|---|---|
|  |  |  |  | PP resin composite material | HDPE resin composite material |
| Example 1 | ST-2VP (9:1) copolymer | Terminal-chlorinated polyolefin | Ultrasonic wave | Dispersed | Dispersed |
| Example 2 | ST-DMAMA (9:1) copolymer | Terminal-chlorinated polyolefin | Ultrasonic wave | Partially aggregated | Partially aggregated |
| Example 3 | ST-4VP (9:1) copolymer | Terminal-chlorinated polyolefin | Ultrasonic wave | Partially aggregated | Partially aggregated |
| Example 4 | ST-2VP (9:1) copolymer | Chlorinated polypropylene | Ultrasonic wave | Partially aggregated | Partially aggregated |
| Example 5 | ST-2VP (9:1) copolymer | Maleic anhydride-modified polypropylene | Ultrasonic wave | Partially aggregated | Partially aggregated |

TABLE 1-continued

|  | Aromatic vinyl copolymer | Polyolefin | Dispersion treatment | Dispersibility of fine graphite particles | |
|---|---|---|---|---|---|
|  |  |  |  | PP resin composite material | HDPE resin composite material |
| Example 6 | ST-2VP (9:1) copolymer | Terminal-chlorinated polyolefin | Wet grinding | Dispersed | Dispersed |
| Comp. Ex. 1 | ST-PM (9:1) copolymer | Terminal-chlorinated polyolefin | Ultrasonic wave | Aggregated | Aggregated |

As is apparent from the results shown in Table 1 and FIGS. 1 to 8, in the cases (Examples 1 to 6) where the fine graphite particles comprising the aromatic vinyl copolymer having amino group were treated with the polyolefin having the reactive moiety, it was found that the fine graphite particles were able to be easily dispersed in the olefin-based resin. This is presumably because the polyolefin chain was introduced into the fine graphite particles by the reaction of the amino group with the reactive moiety, so that the affinity of the fine graphite particles for the olefin-based resin was increased.

On the other hand, in the case (Comparative Example 1) where the fine graphite particles comprising the aromatic vinyl copolymer having no amino group were treated with the polyolefin having the reactive moiety, the fine graphite particles were aggregated in the olefin-based resin, and were difficult to disperse. This is presumably because of the following reason. Specifically, in Comparative Example 1, a functional group such as amino group did not exist in the aromatic vinyl copolymer of the fine graphite particles, and hence the reaction with the polyolefin having the reactive moiety did not proceed. Therefore, the polyolefin chain was not bonded to the aromatic vinyl copolymer, and affinity for the olefin-based resin was not imparted to the fine graphite particles.

Moreover, it was found that the fine graphite particles were able to be more uniformly and more highly dispersed in the olefin-based resin in the cases (Example 1 and Example 6) where the fine graphite particles comprising the aromatic vinyl copolymer containing the 2VP unit were treated with the terminal-chlorinated polyolefin than in the cases (Examples 2 to 3) where the fine graphite particles comprising the aromatic vinyl copolymer containing the DMAMA unit or the 4VP unit were treated with the terminal-chlorinated polyolefin and than in the cases (Examples 4 and 5) where the fine graphite particles comprising the aromatic vinyl copolymer containing the 2VP unit were treated with the chlorinated polypropylene or the maleic anhydride-modified polypropylene. This is presumably because of the following reason. Specifically, the 2VP unit has a higher reactivity with the terminal-chlorinated polyolefin than the DMAMA unit and the 4VP unit, and the terminal-chlorinated polyolefin, which has the functional group at a terminal of the molecule, has a higher reactivity with the 2VP unit than the chlorinated polypropylene having the functional group at an internal position of the molecule and than the maleic anhydride-modified polypropylene. Hence, the polyolefin chain was more easily introduced. Therefore, the polyolefin chain effectively shielded the steric polar group.

Example 7

Fine graphite particles treated with the terminal-chlorinated polyolefin in the same manner as in Example 1 were ground with a dry-type grinding apparatus. A PP resin composite material was prepared by mixing 5 parts by mass of the fine graphite particles treated with the terminal-chlorinated polyolefin and 95 parts by mass of an isotactic polypropylene (PP, manufactured by Aldrich, weight average molecular weight: 190000).

Figure 9:
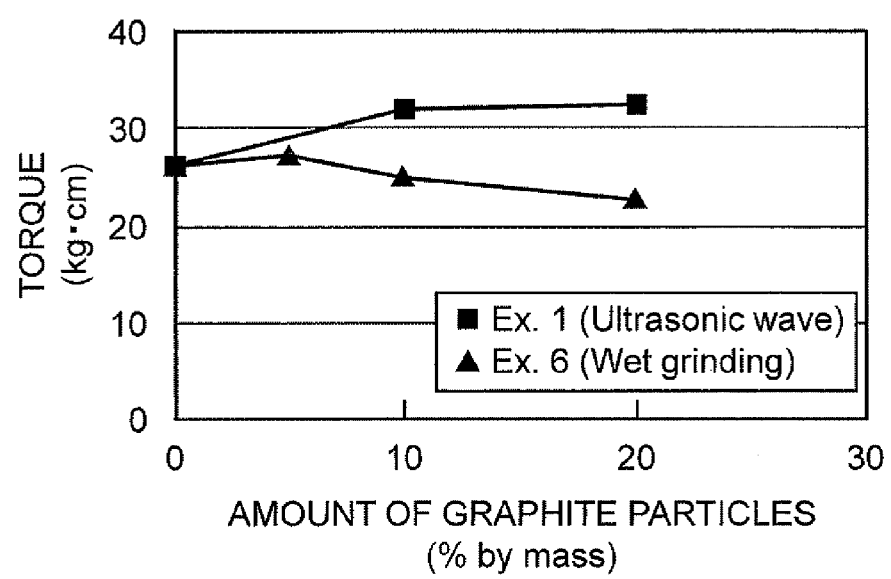
FIG. 9 is a graph showing the relationship between the amount of fine graphite particles or graphite particles in the PP resin composite material and the torque during the kneading of the PP resin composite material.

The PP resin composite material in an amount from which the volume was calculated to be 80 ml based on the specific gravity was kneaded at 190° C. and 100 rpm for 5 minutes by using Labo Plastomill ("18B-200" manufactured by Toyo Seiki Seisaku-sho, Ltd.). FIG. 9 shows the torque during the kneading. The obtained kneaded product was taken out, and subjected to hot press at 190° C. and 40 kg/cm$^2$. Thus, a test piece having a length of 30 mm, a width of 5 mm, and a thickness of 0.5 mm was prepared.

FIG. 10 shows a photograph of the obtained test piece. Moreover, the elastic modulus of this test piece was measured with a viscoelasticity spectrometer ("DVA-220" manufactured by IT Keisoku Seigyo Co., Ltd.). Table 2 and FIGS. 11 and 12 show the storage elastic modulus, the loss elastic modulus, and the loss tangent at 40° C.

Example 8

A PP resin composite material was prepared, and a test piece was prepared in the same manner as in Example 7, except that the amount of the fine graphite particles treated with the terminal-chlorinated polyolefin was changed to 10 parts by mass, and the amount of the isotactic polypropylene was changed to 90 parts by mass. FIG. 9 shows the torque during the kneading. The elastic modulus of the obtained test piece was measured in the same manner as in Example 7. Table 2 and FIGS. 11 and 12 show the storage elastic modulus, the loss elastic modulus, and the loss tangent at 40° C.

Example 9

A PP resin composite material was prepared, and a test piece was prepared in the same manner as in Example 7, except that the amount of the fine graphite particles treated with the terminal-chlorinated polyolefin was changed to 20 parts by mass, and the amount of the isotactic polypropylene was changed to 80 parts by mass. FIG. 9 shows the torque during the kneading. The elastic modulus of the obtained test piece was measured in the same manner as in Example 7. Table 2 and FIGS. 11 and 12 show the storage elastic modulus, the loss elastic modulus, and the loss tangent at 40° C. Moreover, FIG. 13 shows the temperature dependence of the storage elastic modulus.

Example 10

A PP resin composite material was prepared, and a test piece was prepared in the same manner as in Example 7, except that fine graphite particles treated with the terminal-chlorinated polyolefin in the same manner as in Example 6 were used instead of the fine graphite particles treated with the terminal-chlorinated polyolefin in the same manner as in Example 1. FIG. 9 shows the torque during the kneading. The elastic modulus of the obtained test piece was measured in the same manner as in Example 7. Table 2 and FIGS. 11 and 12 show the storage elastic modulus, the loss elastic modulus, and the loss tangent at 40° C.

Example 11

A PP resin composite material was prepared, and a test piece was prepared in the same manner as in Example 10, except that the amount of the fine graphite particles treated with the terminal-chlorinated polyolefin was changed to 10 parts by mass, and the amount of the isotactic polypropylene was changed to 90 parts by mass. FIG. 9 shows the torque during the kneading. The elastic modulus of the obtained test piece was measured in the same manner as in Example 7. Table 2 and FIGS. 11 and 12 show the storage elastic modulus, the loss elastic modulus, and the loss tangent at 40° C.

Example 12

A PP resin composite material was prepared, and a test piece was prepared in the same manner as in Example 10, except that the amount of the fine graphite particles treated with the terminal-chlorinated polyolefin was changed to 20 parts by mass, and the amount of the isotactic polypropylene was changed to 80 parts by mass. FIG. 9 shows the torque during the kneading. The elastic modulus of the obtained test piece was measured in the same manner as in Example 7. Table 2 and FIGS. 11 and 12 show the storage elastic modulus, the loss elastic modulus, and the loss tangent at 40° C. moreover, FIG. 13 shows the temperature dependence of the storage elastic modulus.

Comparative Example 2

A PP resin material was prepared, and a test piece was prepared in the same manner as in Example 7, except that no fine graphite particles treated with the terminal-chlorinated polyolefin were mixed. FIG. 9 shows the torque during the kneading. The elastic modulus of the obtained test piece was measured in the same manner as in Example 7. Table 2 and FIGS. 11 and 12 show the storage elastic modulus, the loss elastic modulus, and the loss tangent at 40° C. Moreover, FIG. 13 shows the temperature dependence of the storage elastic modulus.

Comparative Example 3

A PP resin composite material was prepared, and a test piece was prepared in the same manner as in Example 7, except that graphite particles ("EXP-P" manufactured by Nippon Graphite Industries, ltd., particle diameters: 100 to 600 μm) were used instead of the fine graphite particles treated with the terminal-chlorinated polyolefin. FIG. 10 shows a photograph of the obtained test piece. Moreover, the elastic modulus of this test piece was measured in the same manner as in Example 7. Table 2 and FIGS. 11 and 12 show the storage elastic modulus, the loss elastic modulus, and the loss tangent at 40° C.

Comparative Example 4

A PP resin composite material was prepared, and a test piece was prepared in the same manner as in Comparative Example 3, except that the amount of the graphite particles "EXP-P" was changed to 10 parts by mass, and the amount of the isotactic polypropylene was changed to 90 parts by mass. The elastic modulus of this test piece was measured in the same manner as in Example 7. Table 2 and FIGS. 11 and 12 show the storage elastic modulus, the loss elastic modulus, and the loss tangent at 40° C.

Comparative Example 5

A PP resin composite material was prepared, and a test piece was prepared in the same manner as in Comparative Example 3, except that the amount of the graphite particles "EXP-P" was changed to 20 parts by mass, and the amount of the isotactic polypropylene was changed to 80 parts by mass. The elastic modulus of this test piece was measured in the same manner as in Example 7. Table 2 and FIGS. 11 and 12 show the storage elastic modulus, the loss elastic modulus, and the loss tangent at 40° C. moreover, FIG. 13 shows the temperature dependence of the storage elastic modulus.

TABLE 2

| | Graphite particles | | Storage | Loss | |
| | Type (Dispersion treatment) | Amount (% by mass) | elastic modulus (GPa) | elastic modulus (GPa) | Loss tangent tanδ |
| --- | --- | --- | --- | --- | --- |
| Example 7 | Example 1 (Ultrasonic wave) | 5 | 1.88 | 0.110 | 0.0580 |
| Example 8 | Example 1 (Ultrasonic wave) | 10 | 2.35 | 0.152 | 0.0647 |
| Example 9 | Example 1 (Ultrasonic wave) | 20 | 4.18 | 0.354 | 0.0846 |
| Example 10 | Example 6 (Wet grinding) | 5 | 1.72 | 0.0937 | 0.0543 |
| Example 11 | Example 6 (Wet grinding) | 10 | 2.59 | 0.148 | 0.0574 |
| Example 12 | Example 6 (Wet grinding) | 20 | 3.91 | 0.227 | 0.0580 |
| Comp. Ex. 2 | None | 0 | 1.47 | 0.077 | 0.0520 |
| Comp. Ex. 3 | EXP-P | 5 | 1.32 | 0.079 | 0.0590 |
| Comp. Ex. 4 | EXP-P | 10 | 1.56 | 0.096 | 0.0620 |
| Comp. Ex. 5 | EXP-P | 20 | 2.26 | 0.180 | 0.0800 |

When a filler is added to a resin, in general, the viscosity of the resin composite material increases, and the torque during the kneading increases with the increase in the amount of the filler. However, as is apparent from the results shown in FIG. 9, when the fine graphite particles treated with the terminal-chlorinated polyolefin were added to the PP resin, the increase in torque with the increase in the amount of the fine graphite particles added was relatively small. Hence, the PP resin composite material advantageous for molding was obtained. In particular, it was found that when a wet grinding treatment was performed for preparation of the fine graphite particles according to the present invention, the torque tended to decrease with the increase in the amount of the fine graphite particles added.

As is apparent from the results shown in FIG. 10, it was found that when the fine graphite particles treated with the terminal-chlorinated polyolefin were added to the PP resin, the fine graphite particles were uniformly dispersed in the PP resin (FIG. 10(a)). On the other hand, when the graphite particles which were not fine were added, aggregates of the graphite particles could be detected even by visual observation (FIG. 10(b)).

As is apparent from the results shown in Table 2 and FIGS. 11 and 12, it was found that when the fine graphite particles treated with the terminal-chlorinated polyolefin were added to the PP resin, the elastic modulus of the PP resin composite material increased with the increase in the amount of the fine graphite particles added. It is also found that the tendency toward the increase in elastic modulus was increased as compared with that in the case where the graphite particles which were not fine were added. Moreover, it was found that the tendency toward the increase in elastic modulus was independent of the treatment (the ultrasonic wave treatment or the wet grinding treatment) for dispersing the graphite particles in the preparation of the fine graphite particles according to the present invention.

As is apparent from the results shown in FIG. 13, it was found that the tendency that the PP resin composite materials (Examples 9 and 12) combined with the fine graphite particles treated with the terminal-chlorinated polyolefin had higher elastic moduli than those of the PP resin (Comparative Example 2) and the PP resin composite material (Comparative Example 5) combined with the graphite particles which were not fine was maintained up to around the melting point (150° C.) of the PP resin.

Example 13

<Preparation of Fine Graphite Particles>

36 g of styrene (ST), 4 g of N-phenylmaleimide (PM), 100 mg of azobisisobutyronitrile, and 50 ml of toluene were mixed, and a polymerization reaction was performed under a nitrogen atmosphere at 85° C. for 10 hours. After cooling, purification was performed by reprecipitation using chloroform-hexane. Thus, 27 g of a ST-PM (90:10) random copolymer was obtained. The number average molecular weight (Mn) of this ST-PM (90:10) random copolymer was $5.3 \times 10^4$.

A graphite particle-dispersed liquid was obtained by mixing 12.5 g of graphite particles ("EXP-P" manufactured by Nippon Graphite Industries, ltd., particle diameters: 100 to 600 μm), 12.5 g of urea-hydrogen peroxide inclusion complex, 1.25 g of the ST-PM (90:10) random copolymer, and 500 ml of N,N-dimethylformamide (DMF), and subjecting this mixture to an ultrasonic wave treatment (output power: 250 W) at room temperature for 5 hours. DMF was removed by filtering this graphite particle-dispersed liquid, and the filter cake was subjected to vacuum drying. Thus, fine graphite particles (G1) were obtained.

<Preparation of First Resin Composite Material>

To 10 ml of chloroform, 900 mg of polystyrene (PS, manufactured by Aldrich, number average molecular weight: $1 \times 10^5$) and 100 mg of the fine graphite particles (G1) were added, and, with stirring, the polystyrene was dissolved, and the fine graphite particles were dispersed. The obtained dispersion liquid was subjected to an ultrasonic wave treatment (output power: 250 W) at room temperature for 30 minutes. Subsequently, 10 ml of the dispersion liquid was cast onto a Petri dish with a diameter of 10 cm, and chloroform was removed. Thus, a PS-G1 resin composite material was obtained. This PS-G1 resin composite material was subjected to a press treatment for 1 minute at 150° C. and 5 MPa by using a hot press. The series of these operations (casting-pressing) was repeated five times. Thus, a PS-G1 (90:10) resin composite material was obtained in which the fine graphite particles were uniformly dispersed in the aromatic polymer.

Example 14

A PS-G1 (80:20) resin composite material in which the fine graphite particles were uniformly dispersed in the aromatic polymer was obtained in the same manner as in Example 13, except that the amount of the polystyrene (PS) was changed to 800 mg, and the amount of the fine graphite particles (G1) was changed to 200 mg.

Example 15

A PS-G1 (60:40) resin composite material in which the fine graphite particles were uniformly dispersed in the aromatic polymer was obtained in the same manner as in Example 13, except that the amount of the polystyrene (PS) was changed to 600 mg, and the amount of the fine graphite particles (G1) was changed to 400 mg.

Example 16

A PS-G1 (50:50) resin composite material in which the fine graphite particles were uniformly dispersed in the aromatic polymer was obtained in the same manner as in Example 13, except that the amount of the polystyrene (PS) was changed to 500 mg, and the amount of the fine graphite particles (G1) was changed to 500 mg.

Example 17

A PS-G1 (40:60) resin composite material in which the fine graphite particles were uniformly dispersed in the aromatic polymer was obtained in the same manner as in Example 13, except that the amount of the polystyrene (PS) was changed to 400 mg, and the amount of the fine graphite particles (G1) was changed to 600 mg.

Example 18

A PS-G1 (30:70) resin composite material in which the fine graphite particles were uniformly dispersed in the aromatic polymer was obtained in the same manner as in Example 13, except that the amount of the polystyrene (PS) was changed to 300 mg, and the amount of the fine graphite particles (G1) was changed to 700 mg.

Example 19

A PS-G1 (20:80) resin composite material in which the fine graphite particles were uniformly dispersed in the aromatic polymer was obtained in the same manner as in Example 13, except that the amount of the polystyrene (PS) was changed to 200 mg, and the amount of the fine graphite particles (G1) was changed to 800 mg.

Comparative Example 6

To 10 ml of chloroform, 1000 mg of fine graphite particles (G1) prepared in the same manner as in Example 13 were added, and the fine graphite particles were dispersed with stirring. The obtained dispersion liquid was subjected to an ultrasonic wave treatment (output power: 250 W) at room temperature for 30 minutes. Subsequently, 10 ml of the dispersion liquid was cast onto a Petri dish with a diameter of 10 cm, and chloroform was removed. Thus, fine graphite particles were obtained. The fine graphite particles were subjected to a press treatment for 1 minute at 150° C. and 5 MPa by using a hot press. The series of these operations (casting-pressing) was repeated five times. Thus, a G1 graphite particle material was obtained.

Comparative Example 7

To 10 ml of chloroform, 1000 mg of polystyrene (PS, manufactured by Aldrich, number average molecular weight: $1 \times 10^5$) was added, and the polystyrene was dissolved with stirring. The obtained solution was subjected to an ultrasonic wave treatment (output power: 250 W) at room temperature for 30 minutes. Subsequently, 10 ml of the solution was cast onto a Petri dish with a diameter of 10 cm, and chloroform was removed. Thus, polystyrene was obtained. The polystyrene was subjected to a press treatment for 1 minute at 150° C. and 5 MPa by using a hot press. The series of these operations (casting-pressing) was repeated five times. Thus, a PS resin material was obtained.

Comparative Example 8

A PS-EXP-P (80:20) resin composite material was obtained in the same manner as in Example 14, except that 200 mg of graphite particles ("EXP-P" manufactured by Nippon Graphite Industries, ltd., particle diameters: 1 mm or smaller) were used instead of the fine graphite particles (G1).

Comparative Example 9

A PS-UP-15N (80:20) resin composite material was obtained in the same manner as in Example 14, except that 200 mg of graphite particles ("UP-15N" manufactured by Nippon Graphite Industries, ltd., particle diameter: 15 µm) were used instead of the fine graphite particles (G1).

Comparative Example 10

A PS-MCF (80:20) resin composite material was obtained in the same manner as in Example 14, except that 200 mg of carbon black ("MCF-1000" manufactured by Mitsubishi Chemical Corporation, particle diameter: 18 nm) was used instead of the fine graphite particles (G1).

Comparative Example 11

PS-CF (80:20) resin composite materials of carbon fibers having the following trade names were obtained in the same manner as in Example 14, except that 200 mg of each of the carbon fibers (manufactured by Nippon Graphite Fiber Corporation under the trade name of "GRANOC CF15M" (diameter: 9.5 µm, length: 200 µm), under the trade name "GRANOC CF03S" (diameter: 9.1 µm, length: 400 µm), and under the trade name "GRANOC CF03Z" (diameter: 10 µm, length: 240 µm)) was used instead of the fine graphite particles (G1).

Comparative Example 12

PS-VGCF (80:20) resin composite materials of carbon nanotubes having the following trade names were obtained in the same manner as in Example 14, except that 200 mg of each of the carbon nanotubes (manufactured by Showa Denko K. K., under the trade name of "VGCF" (outer diameter: 150 nm, lengths: 10 to 20 µm), under the trade name "VGCF-X" (outer diameters: 10 to 15 nm, length: 3 µm), and under the trade name "VGCF-S" (outer diameter: 100 nm, length: 10 µm)) was used instead of the fine graphite particles (G1).

Comparative Example 13

PS-ECS (80:20) resin composite materials of glass fibers having the following trade names were obtained in the same manner as in Example 14, except that 200 mg of each of the glass fibers (manufactured by Central Glass Co., Ltd., under the trade name of "ECS03-615" (diameter 9 µm, length: 3 mm) or under the trade name of "ECS03-631K" (diameter 13 µm, length: 3 mm)) was used instead of the fine graphite particles (G1).

<Elastic Modulus and Electrical Resistance>

The PS-G1 resin composite materials prepared in Examples 13 to 19, the PS resin material prepared in Comparative Example 7, and the various resin composite materials prepared in Comparative Examples 8 to 13 were each introduced into a press mold, and subjected to press molding at 190° C. and 5 MPa. Thus, test pieces having a length of 30 mm, a width of 5 mm, and a thickness of 0.5 mm were obtained. On the other hand, the G1 graphite particle material prepared in Comparative Example 6 had no fluidity, so that a test piece was difficult to prepare therefrom.

The elastic modulus of each of the obtained test pieces was measured by using a viscoelasticity spectrometer ("DVA-220" manufactured by IT Keisoku Seigyo Co., Ltd.) with vibration at 10 Hz, while the temperature was raised form room temperature to 150° C. at 5° C./minute. FIGS. 14 and 15 show the measurement results of the storage elastic modulus and the loss elastic modulus of the test pieces prepared from the PS-G1 resin composite materials of Examples 15 to 19 and the PS resin material of Comparative Example 7. Moreover, Tables 3 and 4 and FIGS. 16 and 17 show the storage elastic modulus at 40° C. of each test piece, and Table 3 show the loss elastic modulus at 40° C. of each test piece. Note that the storage elastic modulus, shown in FIG. 17, in the case (Comparative Example 11) where the carbon nanofibers were added is an average value of the storage elastic moduli measured at 40° C. for the respective test pieces of the carbon nanofibers having the trade names. This also applies to the carbon nanotubes (Comparative Example 12) and the glass fibers (Comparative Example 13).

Moreover, the electrical resistance of each of the test pieces was measured by bringing probes of a tester ("CDM-09" manufactured by CUSTOM) into contact with a surface of the test piece, with a distance between the probes being 1 cm. Table 3 and FIG. 16 show the results. Note that, in FIG. 16, the electrical resistance of the G1 graphite particle material obtained in Comparative Example 6 itself measured without preparation of a test piece is shown as the electrical resistance in a case where the amount of the fine graphite particles is 100% by mass.

<Electron Microscopic Observation>

Cross sections of the test pieces were observed with a scanning electron microscope (SEM). FIGS. 18 and 19 show SEM photographs of cross-sections of test pieces prepared from the PS-G1 resin composite material prepared in Example 14 and the PS-EXP-P resin composite material prepared in Comparative Example 8, respectively.

TABLE 3

| | Aromatic polymer | | Fine graphite particles | | Storage elastic modulus Er (GPa, 40° C.) | Loss elastic modulus Ei (GPa, 40° C.) | Electrical resistance R (Ω) |
|---|---|---|---|---|---|---|---|
| | Type | Amount (% by mass) | Type | Amount (% by mass) | | | |
| Comp. Ex. 7 | PS | 100 | — | — | 3.1 | 0.9 | >1 G |
| Example 13 | PS | 90 | G1 | 10 | 6.2 | 4.9 | >500M |
| Example 14 | PS | 80 | G1 | 20 | 7.8 | 7.9 | 10K |

TABLE 3-continued

| | Aromatic polymer | | Fine graphite particles | | Storage elastic modulus Er (GPa, 40° C.) | Loss elastic modulus Ei (GPa, 40° C.) | Electrical resistance R (Ω) |
|---|---|---|---|---|---|---|---|
| | Type | Amount (% by mass) | Type | Amount (% by mass) | | | |
| Example 15 | PS | 60 | G1 | 40 | 15.9 | 1.6 | 110 |
| Example 16 | PS | 50 | G1 | 50 | 16.7 | 1.6 | 30 |
| Example 17 | PS | 40 | G1 | 60 | 25.1 | 1.8 | 20 |
| Example 18 | PS | 30 | G1 | 70 | 25.6 | 1.5 | 30 |
| Example 19 | PS | 20 | G1 | 80 | 24.9 | 1.8 | 5 |
| Comp. Ex. 6 | — | — | G1 | 100 | — | — | (2) |

TABLE 4

| | Graphite particles | | Storage elastic modulus Er (GPa, 40° C.) |
|---|---|---|---|
| | Type | Amount (% by mass) | |
| Example 14 | G1 | 20 | 7.8 |
| Comp. Ex. 8 | EXP-P | 20 | 5.0 |
| Comp. Ex. 9 | UN-15N | 20 | 5.0 |

As is apparent from the results shown in Table 3 and FIG. 16, it was found that when the fine graphite particles according to the present invention were added to and combined with polystyrene, the storage elastic modulus of the resin composite material increased due to a reinforcing effect. Moreover, it was found that when the amount of the fine graphite particles was 60% or less, the storage elastic modulus tended to increase with the increase in the amount of the fine graphite particles, while the storage elastic modulus was constant in the amount of the fine graphite particles exceeded 60%.

In addition, it was found that when the fine graphite particles according to the present invention were added to and combined with polystyrene, the electrical resistance of the resin composite material was lowered, and that when the amount of the fine graphite particles was 80% (Example 19), the electrical resistance was lowered to a value close to the electrical resistance (2Ω) of the case (Comparative Example 6) of the fine graphite particles alone.

As is apparent from the results shown in Table 4, it was found that the storage elastic modulus was higher in the case (Example 14) where the fine graphite particles G1 according to the present invention were added than in the cases (Comparative Examples 8 and 9) where the graphite particles, which were the raw material of the fine graphite particles, were added as they were. This is presumably because of the following reasons. Specifically, as is apparent from the results shown in FIGS. 18 and 19, the fine graphite particles were uniformly dispersed in the resin composite material, and further the plate-like graphite particles were orientated in parallel to the surface of the test piece in the case (Example 14) where the fine graphite particles according to the present invention were added. In contrast, in the case (Comparative Example 8) where the graphite particles EXP-P, which were the raw material of the fine graphite particles, were added as they were, the graphite particles were aggregated in the resin composite material, and took a non-uniform dispersion state. Moreover, the interface bonding force between the polystyrene and the graphite particles was weak, and further the orientation was irregular. Note that the dispersion state in the case (Comparative Example 9) where the graphite particles UN-15N were added as they were was the same as that in the case of the graphite particles EXP-P.

Moreover, the electrical resistances of the test piece measured at multiple measuring points were almost constant in the case (Example 14) where the fine graphite particles G1 according to the present invention were added. On the other hand, the electrical resistance varied among measuring points in the cases (Comparative Examples 8 and 9) where the graphite particles, which were the raw material of the fine graphite particles, were added as they were. For example, areas having insulation properties and areas having electrical conductivity were found even on a surface of a single test piece. This is presumably because of the difference in dispersibility of the graphite particles described above.

As is apparent from the results shown in FIG. 17, the storage elastic modulus was higher in the case (Example 14) where the fine graphite particles G1 according to the present invention were added than in the cases where the carbon black (Comparative Example 10), the carbon nanotubes (Comparative Example 12), and the glass fibers (Comparative Example 13) were added. On the other hand, in the case (Comparative Example 11) where the carbon fibers were added, the storage elastic modulus was achieved which was equivalent to that in the case (Example 14) where the fine graphite particles G1 according to the present invention were added. However, since carbon fiber is expensive, it has been found that the fine graphite particles according to the present invention are superior in terms of costs.

Example 20

A PPE-G1 (90:10) resin composite material in which the fine graphite particles were uniformly dispersed in an aromatic polymer was obtained in the same manner as in Example 13, except that 900 mg of poly(2,6-dimethyl-1,4-phenylene oxide) (PPE, manufactured by Aldrich, number average molecular weight: $5 \times 10^4$) was used instead of the polystyrene, and the press temperature was changed to 290° C.

Example 21

A PPE-G1 (80:20) resin composite material in which the fine graphite particles were uniformly dispersed in the aromatic polymer was obtained in the same manner as in Example 20, except that the amount of the poly(2,6-dimethyl-1,4-phenylene oxide) (PPE) was changed to 800 mg, and the amount of the fine graphite particles (G1) was changed to 200 mg.

Example 22

A PPE-G1 (60:40) resin composite material in which the fine graphite particles were uniformly dispersed in the aromatic polymer was obtained in the same manner as in Example 20, except that the amount of the poly(2,6-dimethyl-1,4-phenylene oxide) (PPE) was changed to 600 mg, and the amount of the fine graphite particles (G1) was changed to 400 mg.

Example 23

A PPE-G1 (50:50) resin composite material in which the fine graphite particles were uniformly dispersed in the aromatic polymer was obtained in the same manner as in Example 20, except that the amount of the poly(2,6-dimethyl-1,4-phenylene oxide) (PPE) was changed to 500 mg, and the amount of the fine graphite particles (G1) was changed to 500 mg.

Example 24

A PPE-G1 (40:60) resin composite material in which the fine graphite particles were uniformly dispersed in the aromatic polymer was obtained in the same manner as in Example 20, except that the amount of the poly(2,6-dimethyl-1,4-phenylene oxide) (PPE) was changed to 400 mg, and the amount of the fine graphite particles (G1) was changed to 600 mg.

Example 25

A PPE-G1 (30:70) resin composite material in which the fine graphite particles were uniformly dispersed in the aromatic polymer was obtained in the same manner as in Example 20, except that the amount of the poly(2,6-dimethyl-1,4-phenylene oxide) (PPE) was changed to 300 mg, and the amount of the fine graphite particles (G1) was changed to 700 mg.

Example 26

A PPE-G1 (20:80) resin composite material in which the fine graphite particles were uniformly dispersed in the aromatic polymer was obtained in the same manner as in Example 20, except that the amount of the poly(2,6-dimethyl-1,4-phenylene oxide) (PPE) was changed to 200 mg, and the amount of the fine graphite particles (G1) was changed to 800 mg.

Comparative Example 14

A PPE resin material was obtained in the same manner as in Comparative Example 7, except that 1000 mg of poly(2,6-dimethyl-1,4-phenylene oxide) (PPE, manufactured by Aldrich, number average molecular weight: $5 \times 10^4$) was used instead of the polystyrene, and the press temperature was changed to 290° C.

<Elastic Modulus and Electrical Resistance>

The PPE-G1 resin composite materials prepared in Examples 20 to 26 and the PPE resin material prepared in Comparative Example 14 were each introduced into a press mold, and subjected to press molding at 300° C. and 5 MPa. Thus, test pieces having a length of 30 mm, a width of 5 mm, and a thickness of 0.5 mm were obtained.

The elastic modulus of each of the obtained test pieces was measured according to the method described in <Elastic Modulus and Electrical Resistance> shown above, except that the range of the measuring temperature was changed to a range from room temperature to 300° C. FIGS. 20 and 21 show the measurement results of the storage elastic modulus and the loss elastic modulus of test pieces prepared from the PPE-G1 resin composite materials of Examples 20 to 26 and the PPE resin material of Comparative Example 14. In addition, Table 5 and FIG. 22 show the storage elastic modulus at 40° C. of each test piece, and Table 5 shows the loss elastic modulus at 40° C. of each test piece.

Moreover, the electrical resistance of each of the test pieces was measured according to the method described in <Elastic Modulus and Electrical Resistance> shown above. Table 5 and FIG. 22 show the results. Note that, in FIG. 22, the electrical resistance of the G1 graphite particle material obtained in Comparative Example 6 itself measured without preparation of a test piece is shown as the electrical resistance in a case where the amount of the fine graphite particles is 100% by mass.

TABLE 5

| | Aromatic polymer | | Fine graphite particles | | Storage elastic modulus Er (GPa, 40° C.) | Loss elastic modulus Ei (GPa, 40° C.) | Electrical resistance R (Ω) |
|---|---|---|---|---|---|---|---|
| | Type | Amount (% by mass) | Type | Amount (% by mass) | | | |
| Comp. Ex. 14 | PPE | 100 | — | — | 1.13 | 0.01 | >500M |
| Example 20 | PPE | 90 | G1 | 10 | 2.67 | 0.04 | >500M |
| Example 21 | PPE | 80 | G1 | 20 | 4.25 | 0.12 | 10M |

TABLE 5-continued

|  | Aromatic polymer | | Fine graphite particles | | Storage elastic modulus Er (GPa, 40° C.) | Loss elastic modulus Ei (GPa, 40° C.) | Electrical resistance R ($\Omega$) |
| --- | --- | --- | --- | --- | --- | --- | --- |
|  | Type | Amount (% by mass) | Type | Amount (% by mass) |  |  |  |
| Example 22 | PPE | 60 | G1 | 40 | 12.1 | 0.54 | 300 |
| Example 23 | PPE | 50 | G1 | 50 | 16.9 | 0.85 | 30 |
| Example 24 | PPE | 40 | G1 | 60 | 20.3 | 1.28 | 10 |
| Example 25 | PPE | 30 | G1 | 70 | 19.3 | 1.27 | 5 |
| Example 26 | PPE | 20 | G1 | 80 | 19.0 | 1.25 | 2 |
| Comp. Ex. 6 | — | — | G1 | 100 | — | — | (2) |

As is apparent from the results shown in Table 5 and FIG. 22, it was found that when the fine graphite particles according to the present invention were added to and combined with polyphenylene ether, the storage elastic modulus of the resin composite material increased due to a reinforcing effect. Moreover, it was found that when the amount of the fine graphite particles was 60% or less, the storage elastic modulus tended to increase with the increase in the amount of the fine graphite particles, while the storage elastic modulus was constant in the amount of the fine graphite particles exceeded 60%.

In addition, it was found that when the fine graphite particles according to the present invention were added to and combined with polyphenylene ether, the electrical resistance of the resin composite material was lowered, and that when the amount of the fine graphite particles was 80% (Example 26), the resin composite material exhibited an electrical conductivity which was equivalent to the electrical resistance (2$\Omega$) of the case (Comparative Example 6) of the fine graphite particles alone.

Example 27

300 mg of polystyrene (PS, manufactured by Aldrich, number average molecular weight: $1 \times 10^5$) and 700 mg of poly(2,6-dimethyl-1,4-phenylene oxide) (PPE, manufactured by Aldrich, number average molecular weight: $5 \times 10^4$) were mixed with each other, and dissolved in 10 mg of chloroform. The obtained solution was cast onto a Petri dish, dried at 25° C., and then subjected to vacuum drying. Thus, a PS30PPE70 resin composition was obtained.

A PS30PPE70-G1 (80:20) resin composite material in which the fine graphite particles were uniformly dispersed in an aromatic polymer was obtained in the same manner as in Example 13, except that 800 mg of the PS30PPE70 resin composition was used instead of the polystyrene, the amount of the fine graphite particles (G1) was changed to 200 mg, and the press temperature was changed to 290° C.

Example 28

A PS30PPE70-G1 (60:40) resin composite material in which the fine graphite particles were uniformly dispersed in the aromatic polymer was obtained in the same manner as in Example 27, except that the amount of the PS30PPE70 resin composition was changed to 600 mg, and the amount of the fine graphite particles (G1) was changed to 400 mg.

Example 29

A PS30PPE70-G1 (40:60) resin composite material in which the fine graphite particles were uniformly dispersed in the aromatic polymer was obtained in the same manner as in Example 27, except that the amount of the PS30PPE70 resin composition was changed to 400 mg, and the amount of the fine graphite particles (G1) was changed to 600 mg.

Example 30

A PS50PPE50 resin composition was obtained in the same manner as in Example 27, except that the amount of the polystyrene was changed to 500 mg, and the amount of the poly(2,6-dimethyl-1,4-phenylene oxide) was changed to 500 mg.

A PS50PPE50-G1 (80:20) resin composite material in which the fine graphite particles were uniformly dispersed in an aromatic polymer was obtained in the same manner as in Example 27, except that 800 mg of the PS50PPE50 resin composition was used instead of the PS30PPE70 resin composition.

Example 31

A PS50PPE50-G1 (60:40) resin composite material in which the fine graphite particles were uniformly dispersed in the aromatic polymer was obtained in the same manner as in Example 30, except that the amount of the PS50PPE50 resin composition was changed to 600 mg, and the amount of the fine graphite particles (G1) was changed to 400 mg.

Example 32

A PS50PPE50-G1 (40:60) resin composite material in which the fine graphite particles were uniformly dispersed in the aromatic polymer was obtained in the same manner as in Example 30, except that the amount of the PS50PPE50 resin composition was changed to 400 mg, and the amount of the fine graphite particles (G1) was changed to 600 mg.

Example 33

A PS70PPE30 resin composition was obtained in the same manner as in Example 27, except that the amount of the polystyrene was changed to 700 mg, and the amount of the poly(2,6-dimethyl-1,4-phenylene oxide) was changed to 300 mg.

A PS70PPE30-G1 (80:20) resin composite material in which the fine graphite particles were uniformly dispersed in an aromatic polymer was obtained in the same manner as in Example 27, except that 800 mg of the PS70PPE30 resin composition was used instead of the PS30PPE70 resin composition.

Example 34

A PS70PPE30-G1 (60:40) resin composite material in which the fine graphite particles were uniformly dispersed in the aromatic polymer was obtained in the same manner as in Example 33, except that the amount of the PS70PPE30 resin composition was changed to 600 mg, and the amount of the fine graphite particles (G1) was changed to 400 mg.

Example 35

A PS70PPE30-G1 (40:60) resin composite material in which the fine graphite particles were uniformly dispersed in the aromatic polymer was obtained in the same manner as in Example 33, except that the amount of the PS70PPE30 resin composition was changed to 400 mg, and the amount of the fine graphite particles (G1) was changed to 600 mg.

Comparative Example 15

A PS30PPE70 resin material was obtained in the same manner as in Comparative Example 7, except that 1000 mg of a PS30PPE70 resin composition prepared in the same manner as in Example 27 was used instead of the polystyrene, and the press temperature was changed to 290° C.

Comparative Example 16

A PS50PPE50 resin material was obtained in the same manner as in Comparative Example 7, except that 1000 mg of a PS50PPE50 resin composition prepared in the same manner as in Example 30 was used instead of the polystyrene, and the press temperature was changed to 290° C.

Comparative Example 17

A PS70PPE30 resin material was obtained in the same manner as in Comparative Example 7, except that 1000 mg of a PS70PPE30 resin composition prepared in the same manner as in Example 33 was used instead of the polystyrene, and the press temperature was changed to 290° C.

<Elastic Modulus and Electrical Resistance>

The various resin composite materials prepared in Examples 27 to 35 and the various resin materials prepared in Comparative Examples 15 to 17 were each introduced into a press mold, and subjected to press molding at 300° C. and 5 MPa. Thus, test pieces having a length of 30 mm, a width of 5 mm, and a thickness of 0.5 mm were obtained.

The elastic modulus of each of the obtained test pieces was measured according to the method described in <Elastic Modulus and Electrical Resistance> shown above, except that the range of the measuring temperature was changed to a range from room temperature to 300° C. Table 6 and FIGS. 23 and 24 show the storage elastic modulus at 40° C. of each test piece, and Table 6 show the loss elastic modulus at 40° C. of each test piece. Note that the results in a PS amount of 100% by mass shown in FIG. 24 are the storage elastic moduli of the PS-G1 resin composite materials of Examples 14, 15, and 17 and the PS resin material of Comparative Example 7. Note also that the results in a PS amount of 0% by mass shown in FIG. 24 are the storage elastic moduli of the PPE-G1 resin composite materials of Examples 21, 22, and 24 and the PPE resin material of Comparative Example 14.

Moreover, the electrical resistance of each of the test pieces was measured according to the method described in <Elastic Modulus and Electrical Resistance> shown above. Table 6 and FIG. 25 show the results. Note that the results in the PS amount of 100% by mass shown in FIG. 25 are the electrical resistances of the PS-G1 resin composite materials of Examples 14, 15, and 17 and the PS resin material of Comparative Example 7. Note also that the results in the PS amount of 0% by mass shown in FIG. 25 are the electrical resistances of the PPE-G1 resin composite materials of Examples 21, 22, and 24 and the PPE resin material of Comparative Example 14.

TABLE 6

| | Aromatic polymer | | | Fine graphite particles | | Storage elastic modulus Er (GPa, 40° C.) | Loss elastic modulus Ei (GPa, 40° C.) | Electrical resistance R (Ω) |
|---|---|---|---|---|---|---|---|---|
| | PS Amount (% by mass) | PPE Amount (% by mass) | PS + PPE Amount (% by mass) | Type | Amount (% by mass) | | | |
| Comp. Ex. 15 | 30 | 70 | 100 | — | — | 2.1 | 0.04 | >500M |
| Example 27 | 30 | 70 | 80 | G1 | 20 | 5.5 | 0.166 | 480 |
| Example 28 | 30 | 70 | 60 | G1 | 40 | 16.6 | 0.816 | 100 |
| Example 29 | 30 | 70 | 40 | G1 | 60 | 21.5 | 1.25 | 13 |
| Comp. Ex. 16 | 50 | 50 | 100 | — | — | 2.9 | 0.061 | >500M |
| Example 30 | 50 | 50 | 80 | G1 | 20 | 12.4 | 0.52 | 660 |
| Example 31 | 50 | 50 | 60 | G1 | 40 | 24.8 | 0.98 | 50 |
| Example 32 | 50 | 50 | 40 | G1 | 60 | 30.0 | 1.50 | 20 |
| Comp. Ex. 17 | 70 | 30 | 100 | — | — | 3.2 | 0.068 | >500M |
| Example 33 | 70 | 30 | 80 | G1 | 20 | 7.8 | 0.25 | 350 |
| Example 34 | 70 | 30 | 60 | G1 | 40 | 24.8 | 1.06 | 60 |
| Example 35 | 70 | 30 | 40 | G1 | 60 | 26.6 | 0.97 | 18 |

As is apparent from the results shown in Table 6 and FIG. 23, it was found that when the fine graphite particles according to the present invention were added to and combined with a resin composition containing the polystyrene and the polyphenylene ether, the storage elastic modulus of the resin composite material having each resin composition increased with the increase in the amount of the fine graphite particles.

Moreover, as is apparent from the results shown in Table 6 and FIG. 24, it was found that when the amounts of the fine graphite particles were same among the resin composite materials of the present invention containing the polystyrene and the polyphenylene ether, the storage elastic modulus took the maximum value at a mass ratio between the polystyrene and the polyphenylene ether of 50:50. Moreover, as is apparent from the results shown in Table 6 and FIG. 25, it was also found that the electrical resistance took the minimum value at a mass ratio between the polystyrene and the polyphenylene ether of 50:50. Such extrema are present presumably because when the two kinds of aromatic polymers were blended, the dispersion structure of the fine graphite particles according to the present invention was changed as compared to those of the cases of one kind alone, so that an appropriate interparticle bonding structure was formed.

INDUSTRIAL APPLICABILITY

As described above, according to the present invention, it is possible to obtain a resin composite material which has a high rigidity, and in which the fine graphite particles are highly dispersed in polystyrene, polyphenylene ether, a mixture thereof, or an olefin-based resin.

Since the fine graphite particles are dispersed in an aromatic polymer or an olefin-based resin in the resin composite material of the present invention, characteristics of the graphite particles such as electrical conductivity and thermal conductivity, as well as the high rigidity, are sufficiently imparted to the aromatic polymer or the olefin-based resin. Therefore, the resin composite material of the present invention is useful for applications where a high rigidity and a high electrical conductivity are required, or applications where a high thermal conductivity is required. For example, the resin composite material of the present invention is useful for automobile parts (for example, formed resin articles, resins for outer panels, sliding members, and interior members), various parts for electrical and electronic devices (for example, electrode materials, heat dissipation materials, and packaging materials), heater materials, and the like.

The invention claimed is:

1. A resin composite material comprising:
fine graphite particles comprising
plate-like graphite particles,
wherein the plate-like graphite particles have a functional group selected from the group consisting of a hydroxyl group, a carboxyl group, and an epoxy group only on a surface thereof and in a region from the surface to a depth of 10 nm;
an aromatic vinyl copolymer which is adsorbed on the plate-like graphite particles, and which contains a vinyl aromatic monomer unit represented by the following formula (1):

—(CH$_2$—CHX)— (1)

in the formula (1), X represents a phenyl group, a naphthyl group, an anthracenyl group, or a pyrenyl group, provided that these groups may have each a substituent, and
at least one hydrocarbon chain which is bonded to the aromatic vinyl copolymer, and which is selected from the group consisting of alkyl chains, oligoolefin chains, and polyolefin chains,
wherein the fine graphite particles are produced by mixing raw material graphite particles, the aromatic vinyl copolymer, a peroxyhydrate, and a solvent, subjecting the obtained mixture to a grinding treatment, introducing the hydrocarbon chain into the aromatic vinyl copolymer, and then removing the solvent; and
an olefin-based resin.

2. The resin composite material according to claim 1, wherein
the fine graphite particles are present in the olefin-based resin in a dispersed state.

3. The resin composite material according to claim 1, wherein
the aromatic vinyl copolymer has a functional group, and the hydrocarbon chain is formed by bonding between the functional group of the aromatic vinyl copolymer and at least one selected from alkyl compounds, oligoolefins, and polyolefins which each have a moiety reactive with the functional group of the aromatic vinyl copolymer.

4. The resin composite material according to claim 3, wherein
the aromatic vinyl copolymer comprises the vinyl aromatic monomer unit and another monomer unit derived from at least one monomer selected from the group consisting of (meth)acrylic acid, (meth)acrylates, (meth)acrylamides, vinylimidazoles, and vinylpyridines.

5. The resin composite material according to claim 3, wherein
the functional group of the aromatic vinyl copolymer is an amino group.

6. The resin composite material according to claim 3, wherein
the moiety reactive with the functional group of the aromatic vinyl copolymer is at least one selected from the group consisting of a chlorine atom, a carboxyl group, and a carboxylic anhydride group.

7. A resin composite material comprising:
fine graphite particles comprising
plate-like graphite particles,
wherein the plate-like graphite particles have a functional group selected from the group consisting of a hydroxyl group, a carboxyl group, and an epoxy group only on a surface thereof and in a region from the surface to a depth of 10 nm; and
an aromatic vinyl copolymer which is adsorbed on the plate-like graphite particles, and which contains a vinyl aromatic monomer unit represented by the following formula (1):

—(CH$_2$—CHX)— (1)

in the formula (1), X represents a phenyl group, a naphthyl group, an anthracenyl group, or a pyrenyl group, provided that these groups may have each a substituent, wherein the fine graphite particles are produced by mixing raw material graphite particles, the aromatic vinyl copolymer, peroxyhydrate, and a solvent, subjecting the obtained mixture to a grinding treatment, and then removing the solvent; and
at least one aromatic polymer selected from the group consisting of polystyrenes and polyphenylene ethers.

8. The resin composite material according to claim 7, wherein
the aromatic polymer is a mixture of a polystyrene and a polyphenylene ether, and
an amount of the polystyrene in the mixture is 20 to 80% by mass.

9. The resin composite material according to claim 7, wherein
the aromatic vinyl copolymer comprises the vinyl aromatic monomer unit and a polar monomer unit.

10. The resin composite material according to claim 9, wherein
the polar monomer unit is a monomer unit derived from at least one monomer selected from the group consisting of (meth)acrylic acid, (meth)acrylates, (meth)acrylamides, vinylpyridines, maleic anhydride, maleimides, and vinylimidazoles.

11. The resin composite material according to claim 7, wherein
a storage elastic modulus at 40° C. is 2 GPa or higher.

12. The resin composite material according to claim 7, wherein
a surface electrical resistance per unit length is $10^4$ Ω/cm or lower.

13. The resin composite material according to claim 7, wherein
an amount of the fine graphite particles is 0.1 to 80% by mass.

14. The resin composite material according to claim 2, wherein
the aromatic vinyl copolymer has a functional group, and
the hydrocarbon chain is formed by bonding between the functional group of the aromatic vinyl copolymer and at least one selected from alkyl compounds, oligoolefins, and polyolefins which each have a moiety reactive with the functional group of the aromatic vinyl copolymer.

15. The resin composite material according to claim 14, wherein
the aromatic vinyl copolymer comprises the vinyl aromatic monomer unit and another monomer unit derived from at least one monomer selected from the group consisting of (meth)acrylic acid, (meth)acrylates, (meth)acrylamides, vinylimidazoles, and vinylpyridines.

16. The resin composite material according to claim 14, wherein
the functional group of the aromatic vinyl copolymer is an amino group.

17. The resin composite material according to claim 14, wherein
the moiety reactive with the functional group of the aromatic vinyl copolymer is at least one selected from the group consisting of a chlorine atom, a carboxyl group, and a carboxylic anhydride group.

18. The resin composite material according to claim 8, wherein
the aromatic vinyl copolymer comprises the vinyl aromatic monomer unit and a polar monomer unit.

19. The resin composite material according to claim 18, wherein
the polar monomer unit is a monomer unit derived from at least one monomer selected from the group consisting of (meth)acrylic acid, (meth)acrylates, (meth)acrylamides, vinylpyridines, maleic anhydride, maleimides, and vinylimidazoles.

* * * * *